(12) United States Patent
Francis et al.

(10) Patent No.: US 10,708,669 B2
(45) Date of Patent: *Jul. 7, 2020

(54) COMPUTER-BASED OPTIMIZED INSERTION OF NON-PROGRAM MEDIA ITEMS IN MEDIA PROGRAMS

(71) Applicant: Palantir Technologies Inc., Palo Alto, CA (US)

(72) Inventors: Jocelyne Francis, Washington, DC (US); Brian Tatum, New York, NY (US); Amanda Held, Santa Monica, CA (US); Justin Streufert, Germantown, MD (US); Sarah Gershkon, New York, NY (US); Anthony Anderson, New York, NY (US); John Urbanik, Brooklyn, NY (US); Jacob Stern, San Francisco, CA (US); Stacy Milspaw, Santa Monica, CA (US); Mahmoud Abdelsalam, Kirkland, WA (US); Grant Wu, Seattle, WA (US); Jake Cornelius, Los Altos, CA (US); Rolando Fentanes, New York, NY (US); Christian Tessier-Lavigne, Palo-Alto, CA (US); Samuel Lite, New York, NY (US); Ankit Buddhiraju, Princeton, NJ (US)

(73) Assignee: PALANTIR TECHNOLOGIES, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,784

(22) Filed: Jan. 15, 2018

(65) Prior Publication Data
US 2018/0139515 A1 May 17, 2018

Related U.S. Application Data

(63) Continuation of application No. 15/220,485, filed on Jul. 27, 2016, now Pat. No. 9,872,083.
(Continued)

(51) Int. Cl.
*H04N 21/81* (2011.01)
*H04N 21/234* (2011.01)
(Continued)

(52) U.S. Cl.
CPC ..... *H04N 21/812* (2013.01); *H04N 21/23424* (2013.01); *H04N 21/2668* (2013.01);
(Continued)

(58) Field of Classification Search
CPC .......... H04N 21/812; H04N 21/23424; H04N 21/26241; H04N 21/2668; H04N 21/458; H04N 21/845
See application file for complete search history.

(56) References Cited

U.S. PATENT DOCUMENTS 7,870,589 B2 1/2011 Ducheneaut et al.
8,046,797 B2 10/2011 Bentoilila et al.
(Continued)

FOREIGN PATENT DOCUMENTS

EP 3125564 2/2017

OTHER PUBLICATIONS

U.S. Appl. No. 15/220,485, filed Jul. 27, 2016, Office Action dated Dec. 15, 2016.
(Continued)

*Primary Examiner* — Randy A Flynn
(74) *Attorney, Agent, or Firm* — Hickman Palermo Becker Bingham LLP

(57) ABSTRACT

In one embodiment, a data processing method comprises generating impression estimate data that specifies an estimated total number of impressions of a plurality of non-program media items that are possible during future transmission of a plurality of media programs via a plurality of media channels; based on the impression estimate data, generating campaign data specifying a target number of
(Continued)

impressions of a particular non-program media item and specifying one or more particular media channels to receive the particular non-program media item; based on the campaign data, and based upon transmission schedule data that specifies future times of transmission of the plurality of media programs via the plurality of media channels, automatically determining digitally stored promotional schedule data that specifies a plurality of times to transmit the particular non-program media item to achieve the target number of impressions; wherein the method is performed by one or more computing devices.

18 Claims, 27 Drawing Sheets

Related U.S. Application Data

(60) Provisional application No. 62/197,442, filed on Jul. 27, 2015.

(51) Int. Cl.
*H04N 21/262* (2011.01)
*H04N 21/2668* (2011.01)
*H04N 21/458* (2011.01)
*H04N 21/845* (2011.01)

(52) U.S. Cl.
CPC ..... *H04N 21/26241* (2013.01); *H04N 21/458* (2013.01); *H04N 21/845* (2013.01)

(56) References Cited

U.S. PATENT DOCUMENTS

| | | | |
|---|---|---|---|
| 8,087,044 B2 | 12/2011 | Krause et al. | |
| 8,667,528 B2 | 3/2014 | Yu et al. | |
| 9,872,083 B2 | 1/2018 | Francis et al. | |
| 2001/0020236 A1 | 9/2001 | Cannon | |
| 2001/0042251 A1 | 11/2001 | Marshall et al. | |
| 2003/0050827 A1 | 3/2003 | Hennessey | |
| 2003/0084126 A1* | 5/2003 | Kumar | G06Q 30/02 709/219 |
| 2004/0092268 A1 | 5/2004 | Xu | |
| 2004/0133467 A1* | 7/2004 | Siler | G06Q 30/02 705/14.61 |
| 2005/0105725 A1 | 5/2005 | Lee | |
| 2008/0189752 A1 | 8/2008 | Moradi et al. | |
| 2008/0271070 A1 | 10/2008 | Kanojia et al. | |
| 2009/0099902 A1 | 4/2009 | Chatter et al. | |
| 2011/0246406 A1 | 10/2011 | Lahav et al. | |
| 2014/0046751 A1* | 2/2014 | Akbar | G06Q 30/02 705/14.39 |
| 2014/0101686 A1 | 4/2014 | Kitts et al. | |
| 2014/0316882 A1 | 10/2014 | Swix et al. | |
| 2014/0337136 A1* | 11/2014 | Tinsman | G06Q 30/0264 705/14.58 |
| 2015/0029944 A1 | 1/2015 | Nama et al. | |
| 2015/0189351 A1 | 7/2015 | Kitts et al. | |
| 2016/0330526 A1 | 11/2016 | Marchetti et al. | |
| 2017/0034594 A1 | 2/2017 | Francis et al. | |

OTHER PUBLICATIONS

U.S. Appl. No. 15/220,485, filed Jul. 27, 2016, Final Office Action dated Jun. 9, 2017.
U.S. Appl. No. 15/220,485, filed Jul. 27, 2016, Notice of Allowance dated Sep. 5, 2017.
Office Action for European Patent Application No. 16181552.7 dated Nov. 8, 2017.
Official Communication for European Patent Application No. 16181552.7 dated Dec. 23, 2016.

\* cited by examiner

FIG. 4

GRAPHICAL USER INTERFACE 300

SCHEDULE 400

| | SUN | MON | TUES | WED | THUR | FRI | SAT |
|---|---|---|---|---|---|---|---|
| 8:14:20 | PURPLE | BLUE | GREEN | YELLOW | GREEN | BLUE | PURPLE |
| 8:14:40 | BLUE | GREEN | YELLOW | ORANGE | YELLOW | GREEN | BLUE |
| 8:14:55 | GREEN | YELLOW | ORANGE | RED | ORANGE | YELLOW | GREEN |
| 8:15:10 | BLUE | GREEN | YELLOW | ORANGE | YELLOW | GREEN | BLUE |

LEGEND 402

| RANK 404 | COLOR 406 |
|---|---|
| 1 | RED |
| 2 | ORANGE |
| 3 | YELLOW |
| 4 | GREEN |
| 5 | BLUE |
| 6 | PURPLE |

FIG. 6

| PROMOTION 212 | TARGET PROMOTION FREQUENCY 604 | TARGET CONSUMPTION LEVEL 606 | ACTUAL PROMOTION FREQUENCY 608 | ACTUAL CONSUMPTION LEVEL 610 |
|---|---|---|---|---|
| SHOW A | EVERY 180 MINUTES | 400 GRPs | EVERY 150 MINUTES | 348 GRPs |
| SHOW B | EVERY 120 MINUTES | 600 GRPs | EVERY 190 MINUTES | 86 GRPs |
| SHOW C | EVERY 200 MINUTES | 200 GRPs | EVERY 230 MINUTES | 73 GRPs |

GRAPHICAL USER INTERFACE 300
VIEW 600
USER-SPECIFIED CONSTRAINTS 602

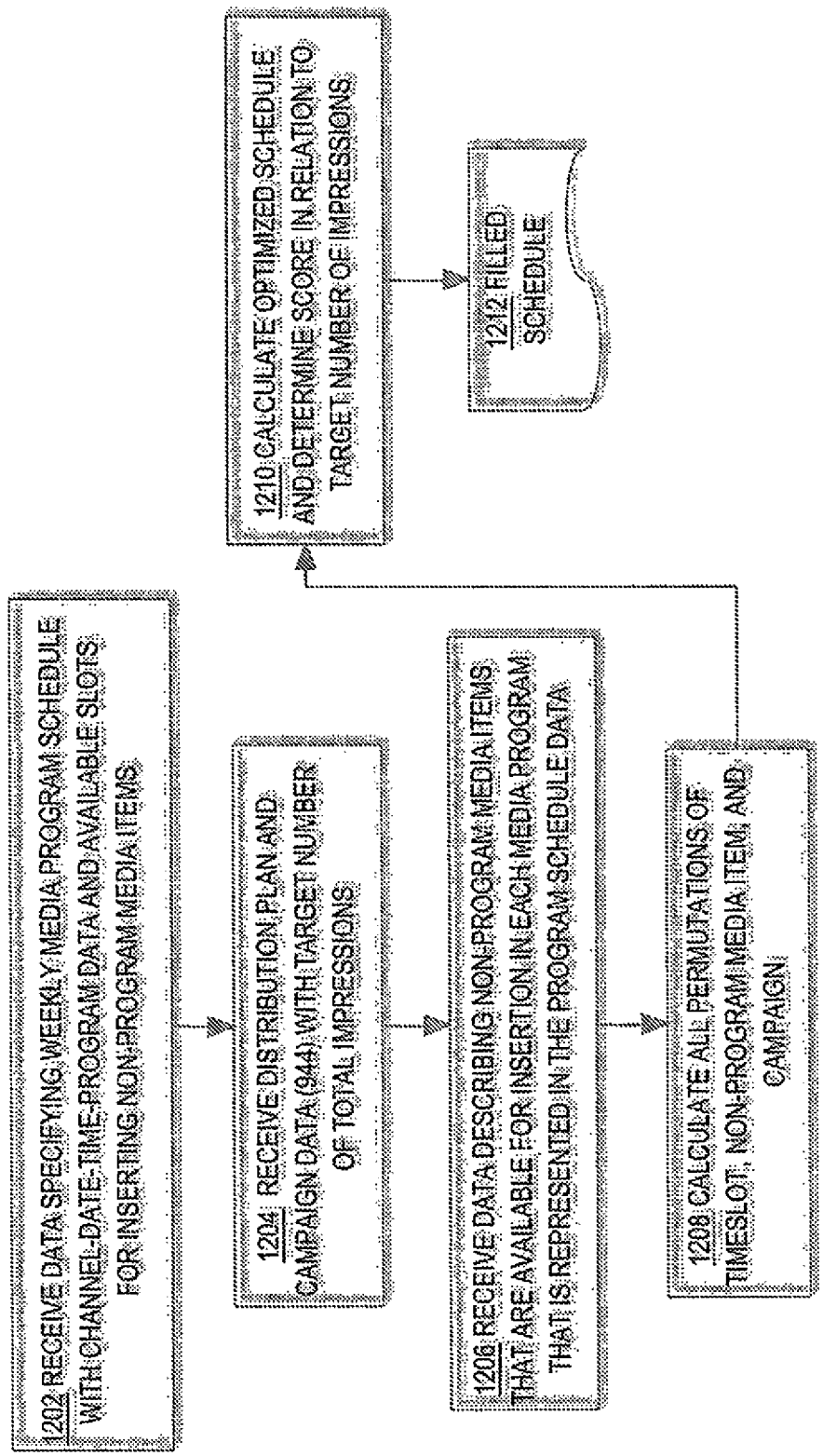

COMPUTER-BASED OPTIMIZED INSERTION OF NON-PROGRAM MEDIA ITEMS IN MEDIA PROGRAMS

BENEFIT CLAIM

This application claims the benefit as a Continuation of application Ser. No. 15/220,485, filed Jul. 27, 2016 the entire contents of which is hereby incorporated by reference as if fully set forth herein, under 35 U.S.C. § 120; which claims priority to U.S. Provisional Application No. 62/197,442, filed Jul. 27, 2015.

FIELD OF THE DISCLOSURE

One technical field of the disclosure is computer programs and computer systems that are programmed to calculate optimized insertion of non-program media items into media programs such as television or video programs. Another technical field is computer-implemented estimating, planning and scheduling algorithms usable with television and video programs. SUGGESTED ART UNIT: 2425; CLASS 725, SUBCLASS 32.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Audiovisual programs are delivered using a variety of media networks that implement television, cable, satellite, internet television, and online video hosting technologies to end user devices such as television sets, smart TVs, desktop computers and mobile devices. Typically these media systems transmit or broadcast both substantive program content and non-program media items within a specified time period. However, to date, the techniques that have been used to determine exactly when to insert a non-program media item within a media program have been primitive. Determining exactly how many end user devices will receive a media program, which non-program media items to display, and when to display them, have involved large amounts of manual data analysis and primitive planning tools such as spreadsheets.

One type of non-program media item that may be used, in this context, is a video segment that describes, discusses or promotes another media program that is aired or carried by a particular network. In most cases, the prior manual approaches for determining which non-program media items to display have worked only with non-program media items that relate to media programs carried in the same network. There has been no commonplace or convenient approach for planning and scheduling the presentation of non-program media items in one network that relate to media programs that are aired or carried on a second, different network. This drawback has also existed even when the first network and the second network are owned or operated by the same legal entity, such as a media holding company that runs many networks.

BRIEF DESCRIPTION OF THE DRAWINGS

In the drawings:

FIG. 4 depicts an example of ranked timeslots comprising different colors.

FIG. 6 depicts an approach for monitoring promotion consumption.

FIG. 12 is a flow diagram illustrating a process that may serve as an example algorithm for implementing scheduling instructions.

FIG. 19 illustrates an example graphical user interface screen display that is programmed to select ISCIs for editing and adding to a campaign.

FIG. 24 illustrates a first section of an overview page that displays campaign information for current campaigns, as part of a reporting interface.

Figure 1:
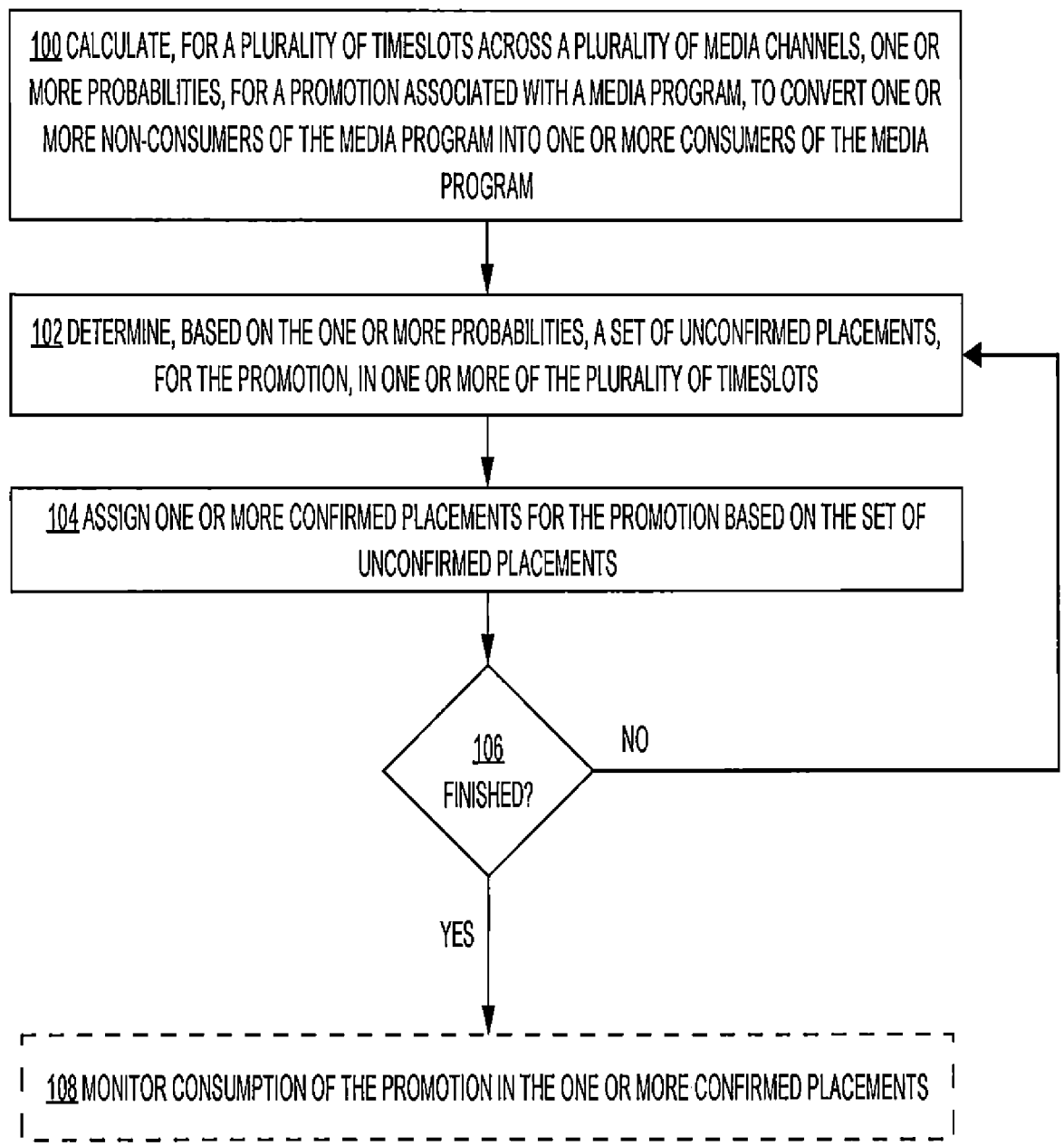
FIG. 1 is a flow diagram that depicts an approach for automatic promotion scheduling across multiple media channels.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments. Selected drawing figures have been originally filed in an informal form with redaction marking in positions in which text or numbers would be displayed or shown in an implementation; text and numbers form a part of these drawing figures and hypothetical text and numbers that is substituted in the formal drawings should be understood as constituting a part of the original disclosure since the specific content of such text and numbers is not critical.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to "a computer" herein may mean one or more computers, unless expressly stated otherwise.

While some of the aforementioned elements are depicted in the figures and described herein as if implemented on a separate, remote computer from each other, this is done for explanation purposes only and one or more of the elements may be part of and/or executed on the same computer. Each of the logical and/or functional units depicted in the figures or described herein may be implemented using any of the techniques further described herein in connection with FIG. 8. For example, a computer may comprise a general-purpose computer configured with one or more stored programs which when executed cause performing the functions described herein for one or more logical and/or functional units; a special-purpose computer with digital logic that is configured to execute the functions; or digital logic that is used in other computing devices. While the figures include lines that indicate various devices and/or modules being communicatively coupled, each of the computers, devices, modules, storage, and logic may be communicatively coupled with each other.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first", "second", and "third" may be used to differentiate elements, but the modifiers do not necessarily indicate any particular order. For example, a second set of unconfirmed placements may be so named although, in reality, it may correspond to a second, third, and/or fourth set of unconfirmed placements.

Embodiments are described in sections below according to the following outline:
1. GENERAL OVERVIEW
2. EXAMPLE NETWORK TOPOLOGY
3. FUNCTIONAL OVERVIEW OF EXAMPLE PROGRAMMED SYSTEM
    3.1 PROJECTION INSTRUCTIONS
    3.2 PLANNING INSTRUCTIONS
    3.3 SCHEDULING INSTRUCTIONS
        3.3.1 SCHEDULING PROMOTIONS ACROSS MULTIPLE MEDIA CHANNELS
        3.3.2 SCHEDULING PROMOTIONS
        3.3.3 CALCULATING CONVERSION PROBABILITIES
        3.3.4 EXAMPLE UNCONFIRMED PLACEMENTS
        3.3.5 EXAMPLE RANKED TIMESLOTS
        3.3.6 RE-OPTIMIZING UNCONFIRMED PLACEMENTS
        3.3.7 TRACKING PROMOTIONAL CAMPAIGNS
    3.4 REPORTING INSTRUCTIONS
    3.5 EXAMPLE GRAPHICAL USER INTERFACE IMPLEMENTATION
    3.6 EXAMPLE REPORTING INTERFACE
4. EXAMPLE IMPLEMENTING MECHANISM—HARDWARE OVERVIEW
5. EXTENSIONS AND ALTERNATIVES 1. General Overview Computer-implemented techniques are disclosed for simultaneous scheduling of multiple non-program media items in a media program promotion schedule that spans multiple media channels. Computer-executed instructions are used, in one embodiment, to project a number of impressions of a non-program media item that are possible across a plurality of networks or other distribution channels that are owned or operated by a legal entity, such as a media holding company; to plan campaigns represented in stored digital data that express what non-program media items to distribute and how often; automatic scheduling of a correct number of broadcasts, telecasts or other communication of the non-program media items within a schedule of program airdates and times; and optionally reporting and feedback on the actual performance of the planned schedule of airing of the non-program media items in terms of the actual number of impressions achieved. The scheduling may include automatically determining placements of the non-program media items in the media program schedule in a way that takes into account data from various different data sources including, for example, user-specified constraints, ratings data, duplication values, and other digital data while at the same time balancing competing placement parameters, such as priorities, revenue opportunity cost, ratings, etc.

In one embodiment, a data processing method comprises generating impression estimate data that specifies an estimated total number of impressions of a plurality of non-program media items that are possible during future transmission of a plurality of media programs via a plurality of media channels; based on the impression estimate data, generating campaign data specifying a target number of impressions of a particular non-program media item and specifying one or more particular media channels to receive the particular non-program media item; based on the campaign data, and based upon transmission schedule data that specifies future times of transmission of the plurality of media programs via the plurality of media channels, automatically determining digitally stored promotional schedule data that specifies a plurality of times to transmit the particular non-program media item to achieve the target number of impressions; wherein the method is performed by one or more computing devices. In addition to total impressions, in some embodiments, complexity and additional targeting accuracy comes from impression estimates for varying demographic categories.

In one embodiment, a data processing method comprises calculating, for each available timeslot of a plurality of available timeslots across a plurality of media channels, a conversion probability that a particular promotion of a particular media program, if presented during the available timeslot, would convert one or more current non-consumers of the particular media program to one or more consumers of the particular media program; automatically selecting, from the plurality of available timeslots, a first plurality of unconfirmed placements for presenting the particular promotion based, at least in part, on the conversion probabilities calculated for the first plurality of unconfirmed placements; selecting, from the first plurality of unconfirmed placements, one or more confirmed placements for presenting the particular promotion based, at least in part, on input by a user that selects the one or more confirmed placements; and scheduling the particular promotion for presentation during the one or more confirmed placements.

The non-program media items, in some embodiments, comprise audiovisual segments or video segments, the content of which communicates promotional messages relating to another media program, such as a television show. In other embodiments, non-program media items contain other information content such as public service announcements, emergency broadcast information, or government announcements. The particular content included in a non-program media item is not essential to this disclosure. The techniques herein also can be applied to non-TV application areas such as podcasts, radio, on-demand video, web-based live streaming, streaming music distribution, web-based music distributions, and other media.

In an embodiment, a user computer manages, via a graphical user interface, a campaign involving inserting a non-program media item into media programs or between media programs across multiple media channels, such as, for example, television and/or radio channels. A media networks may own or operate a plurality of media channels, and a plurality of media networks may be owned or operated by a single legal entity such as a media holding company. The promotional campaign may seek to advertise a particular media program, such as a television series, a particular episode of the television series, a radio show, a sporting event, a film, and/or a presidential speech, as examples. However, embodiments are not limited to advertising or promotions but are generally applicable to projecting, planning and scheduling impressions of non-program media items in association with other media programs.

The user computer may input one or more parameters for the promotional campaign into the graphical user interface. The one or more parameters may include a desired frequency with which a particular non-program media item is to be presented and/or a desired number of times the particular non-program media item is to be presented. For example, the user may specify that the particular non-program media item be presented at least every hour for a total of 500 Gross Rating Points (GRPs). Alternatively, promotions can be expressed in currency units such as dollars.

For the sake of clarity and ease of explanation, examples and illustrations herein describe automatic scheduling of a single non-program media item at a time. However, multiple promotions may be simultaneously scheduled based on balancing competing parameters of the multiple promotions. For example, Show A and Show B may be associated with parameters of 500 and 700 GRPs, respectively, but promotions for Show A and Show B may be simultaneously scheduled in such a manner that both Show A and Show B satisfy their respective parameters.

The client computer may communicate with a server computer that has access to information about television sets, other video displays or computers, consumers and their consumption behavior. For example, the server computer may have access to NIELSEN ratings data that indicate which TVs or other viewing devices are consuming which media channel at what time. Based on the information about devices and their consumption behavior, the server computer may determine conversion probabilities associated with placing the particular non-program media item in available timeslots. The conversion probabilities may predict the likelihood that a non-consumer of the particular media program will become a consumer of the particular media program. For example, the NIELSEN ratings data may indicate that 71% of computers associated with people who fit profile A watch Show A and that 95% of computers of people who fit profile A watch Show B. Thus, the server computer may determine that placing a particular non-program media item for Show A during the presentation of Show B has a conversion probability of 24%.

The available timeslots may be associated with different media channels. For example, one available timeslot may exist on Channel 5, and another available timeslot may exist on Channel 11. The available timeslots may be associated with other media programs. For example, the available timeslots may fall within break periods scheduled during the presentations of the other media programs. The conversion probabilities may predict, for each of the other media programs, the likelihood that a non-consumer of the particular media program will become a consumer of the particular media program based on similarities between the particular media program and one of the other media programs. The similarities may include similar genres and/or similar audience demographics. For example, the promotion for Show A may have a 91% conversion probability if presented during Show B, because Show A and Show B are both comedies that teenagers enjoy.

The server computer may generate, based on the conversion probabilities and/or the one or more parameters, scores that indicate appropriateness for the particular promotion in the available timeslots. For example, the promotion for Show A may receive a score of 97.1 with a particular timeslot during the presentation of Show B. The server computer may determine, based on the scores, a set of unconfirmed placements for the particular promotion in one or more of the available timeslots. For example, the set of unconfirmed placements may include the available timeslots in which a score of the particular promotion ranked among the top three scores relative to other promotions.

The set of unconfirmed placements may be displayed to the user through the graphical user interface. The set of unconfirmed placements may be associated with the particular promotion and one or more alternative promotions. For example, when the user selects a timeslot identified as an unconfirmed placement, a list of promotions with the top three scores for the timeslot may be displayed in the graphical user interface. The set of unconfirmed placements may be associated with comparison metrics. For example, when the user selects an unconfirmed placement, a list of promotions may be displayed along with reasons for selecting one promotion over another promotion. The comparison metrics may include a demographic correlation between a promoted media program and a media program being presented. For example, the promotion for Show A may be a better choice than a promotion for Show C, because Show A is a 95% demographic match with Show B whereas Show C is a 93% demographic match with Show B. The comparison metrics may include a conversion prediction for a promotion. For example, the promotion for Show A may be expected to convert 31% of Show B's audience, but the promotion for Show C may be expected to convert 28% of Show B's audience. The comparison metrics may include a temporal proximity to a previous presentation of the promotion. For example, the promotion for Show A may not have been presented recently, but the promotion for Show C may have been presented recently. The comparison metrics may include a temporal proximity to the presentation of the promoted media program. For example, Show A may be scheduled for presentation within a shorter time than Show B.

The set of unconfirmed placements may include rankings. For example, a particular unconfirmed placement may be identified as the best unconfirmed placement, and another unconfirmed placement may be identified as the second best unconfirmed placement. The rankings may be conveyed to the user via colors. For example, the best unconfirmed placement may be colored red, and the second best unconfirmed placement may be colored orange.

The user may select one or more of the set of unconfirmed placements to be one or more confirmed placements. For example, the user may click a "Save" button associated with one or more unconfirmed placements to designate one or more or all of the confirmed placements for the particular promotion. The user may then request that the server computer determine another set of unconfirmed placements based on the one or more confirmed placements. For example, the one or more confirmed placements may add and/or remove one or more timeslots from the set of unconfirmed placements. This process may repeat as necessary.

When the user is finished assigning confirmed placements, the server computer may send the one or more confirmed placements into the production pipeline. For example, the server computer may send the one or more confirmed placements to one or more of the plurality of media channels. The user may monitor the one or more confirmed placements. For example, the user may track how often the particular promotion is being presented and/or how many GRPs are associated with the particular promotion. The user may then make adjustments to the confirmed placements as necessary.

In one embodiment, the techniques herein will be useful for a user computer of a media executive and/or an advertisement scheduling engineer, which may need to determine the best points of insertion for a particular non-program media item. In some embodiments, the techniques may be used to determine optimized placements for an advertisement, such as a promotion for a media program. However, the user computer may have insufficient data to determine the best times and/or the best media channels for placing the advertisement. The user computer may be unable to synthesize available data into predictions about audience behavior. The user computer may be unable to price a particular timeslot on a particular media channel. Thus, the user computer may determine an ineffective placement for the advertisement. As a result, a revenue opportunity may be missed, because an interested party, such as a content creator, a retailer, and/or a manufacturer, may be unable to reach an interested audience. However, as the disclosure will clarify, embodiments are not limited to this context and do not require use with advertising or promotions.

2. Example Network Topologies

Figure 9:
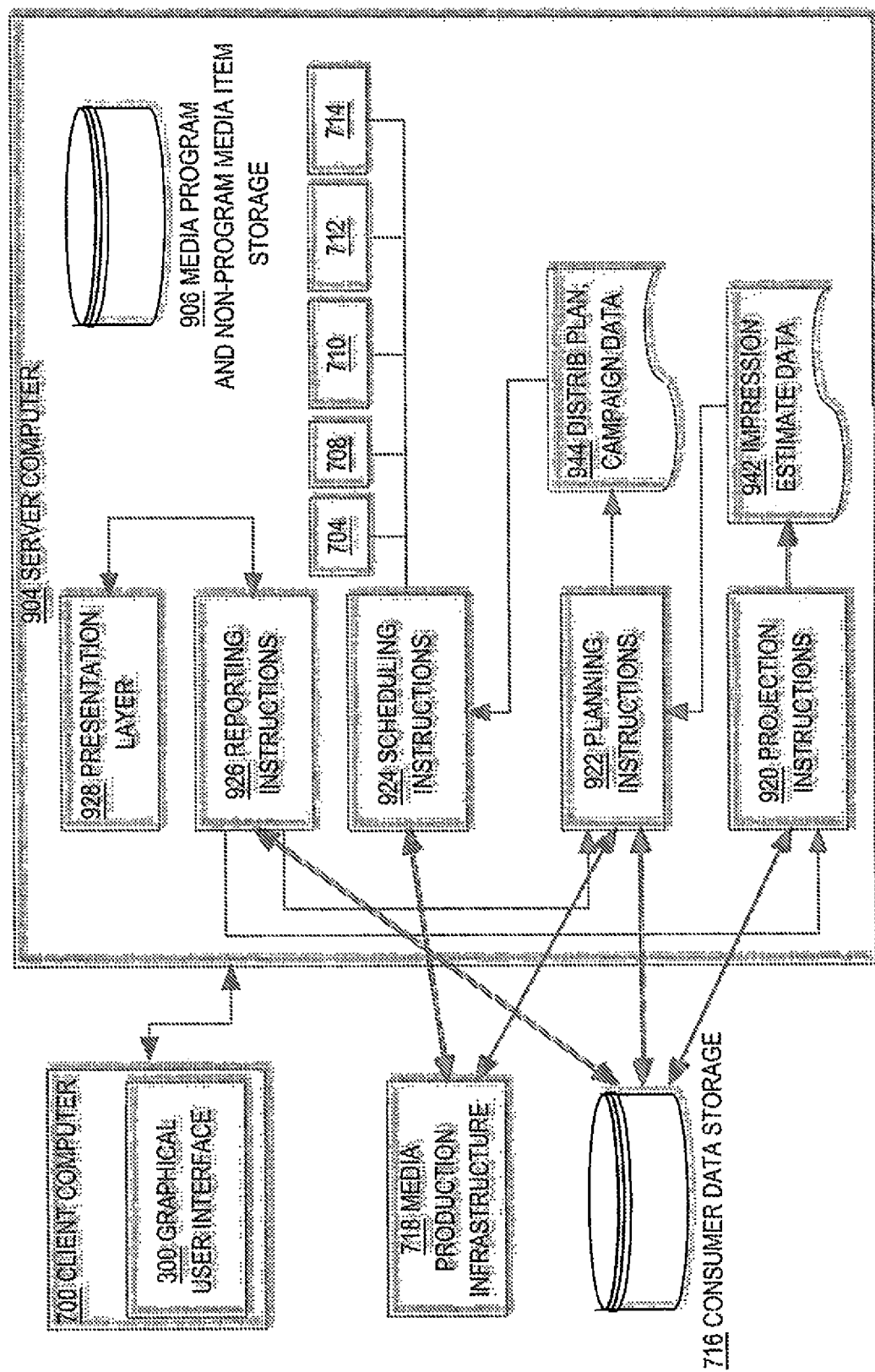
FIG. 9 depicts a first example computer architecture on which embodiments may be implemented.

FIG. 9 depicts a first example computer architecture on which embodiments may be implemented. In the example of FIG. 9, client computer 700 comprising graphical user interface 300 is communicatively coupled to server computer 904 comprising projection instructions 920, planning instructions 922, scheduling instructions 924, reporting instructions 926, presentation layer 928, and storage 906 for metadata relating to media programs and non-program media items. Server computer 904 is also communicatively coupled to consumer data storage 716 and media production infrastructure 718.

Client computer 700 may be a desktop computer, a laptop computer, a smartphone, a tablet computer, a smart television, and/or any other networked computer that acts as a client. Client computer 700 may interact with the user through graphical user interface 300. In some embodiments, graphical user interface 300 is generated using a browser program hosted at client computer 700 that renders pages, instructions, or other data items in cooperation with a presentation layer 928 of server computer 904.

Server computer 904 may comprise one or more server computers and/or one or more load balancers. Server computer 904 may comprise a networked computer that acts as a server to one or more clients, such as client computer 700. Server computer 904 may receive requests for data and may respond with data. Server computer 904 may be owned and/or managed by one or more independent entities and may span across one or more computer networks, such as the Internet. Additionally or alternatively, server computer 904 may respond with data that references data on server computer 904 and/or another computer.

In an embodiment, server computer 904 is communicatively coupled to multiple client computers corresponding to a program rating service, one or more media executives, one or more scheduling engineers, and/or one or more production engineers. The one or more media executives may input parameters for one or more media channels. The one or more scheduling engineers may review and approve promotion schedules and/or promotions. The one or more production engineers may make the promotions to be placed in the promotion schedules. Thus, server computer 904 may centrally manage and/or provide a standardized interface for managing a promotional campaign from its conception by the one or more media executives to its delivery into media production infrastructure 718. Each of the aforementioned users may have different permission levels that restrict user interaction with server computer 904. In an embodiment, permission levels may differ based on a user group. For example, server computer 904 may manage user access in such a manner (e.g., via an authentication protocol) that a production engineer is unable to change a promotion schedule.

Media program and promotion metadata storage 906 may be a database, a configuration file, and/or any other system and/or data structure that stores data, and is accessible to all the instructions and other functional elements of server computer 904 that are seen in FIG. 9. Media program and promotion metadata storage 906 may be on a separate device from server computer 904. Additionally or alternatively, media program and promotion metadata storage 906 may be a data structure stored in memory on the one or more computers comprising, at least in part, server computer 904. Additionally or alternatively, media program and promotion metadata storage 906 may, at least in part, be a data structure stored in shared memory between one or more computers. Additionally or alternatively, media program and promotion metadata storage 906 may be, at least in part, non-volatile storage. Media program and promotion metadata storage 906 may store information about media programs or non-program media items. Non-program media items may comprise promotional segments, in one embodiment. The information may comprise genre data, a promotion length, media channel data, and/or a time window associated with the presentation of media programs, non-program media items, and/or the promoted media program.

Consumer data storage 716 may be a data feed, external service or computer, database, a configuration file, and/or any other system and/or data structure that stores data or provides data using messaging, an application program interface (API), or other data transfer mechanisms. Consumer data storage 716 may be on a separate device from server computer 904. Additionally or alternatively, consumer data storage 716 may be a data structure stored in memory on the one or more computers comprising, at least in part, server computer 904. Additionally or alternatively, consumer data storage 716 may, at least in part, be a data structure stored in shared memory between one or more computers. Additionally or alternatively, consumer data storage 716 may be, at least in part, non-volatile storage. Consumer data storage 716 may comprise media consumption data and/or demographic data. Consumer data storage 716 may be owned by a separate independent entity, such as Nielsen.

Media production infrastructure 718 may process the one or more confirmed placements from server computer 904, and other functions as further described herein in other sections. Media production infrastructure 718 may execute the wishes of the user as indicated by the one or more confirmed placements. Media production infrastructure 718 may notify server computer 904 and/or client computer 700 when an unscheduled opportunity for presentation of a promotion manifests. Server computer 904 may automatically determine one or more confirmed placements if the user is unable to respond to the unscheduled opportunity in a timely manner.

Each of the projection instructions 920, planning instructions 922, scheduling instructions 924, and reporting instructions 926 comprises a set of programmed instructions that are executable using server computer 904 to perform the data processing functions that are further described herein in other sections. The instructions may be implemented using a programming language such as JAVA, C, C++, OBJECTIVE-C, and/or scripting languages or other compiled or interpreted languages.

Figure 7:
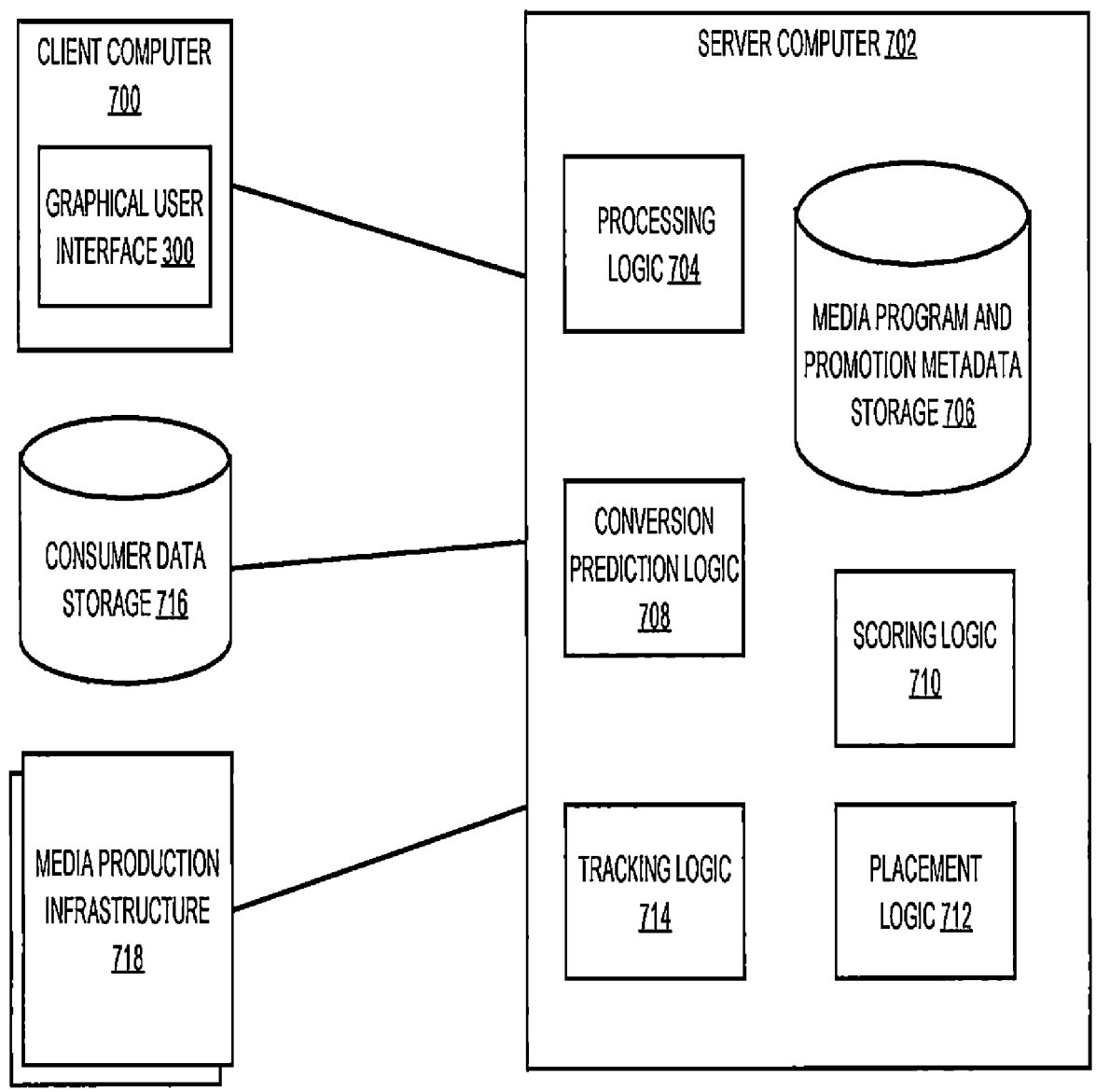
FIG. 7 depicts an example computer architecture on which embodiments may be implemented.

FIG. 7 depicts another example computer architecture on which embodiments may be implemented. In the example of FIG. 7, client computer 700 comprising graphical user interface 300 is communicatively coupled to server computer 702 comprising processing logic 704, media program and promotion metadata storage 706, conversion prediction logic 708, scoring logic 710, placement logic 712, and tracking logic 714. Server computer 702 is also communicatively coupled to consumer data storage 716 and media production infrastructure 718.

Client computer 700 may be a desktop computer, a laptop computer, a smartphone, a tablet computer, a smart television, and/or any other networked computer that acts as a client. Client computer 700 may interact with the user through graphical user interface 300. Client computer and/or graphical user interface 300 may send one or more parameters for a promotional campaign, one or more user-specified constraints 602, and/or one or more confirmed placements to server computer 702. Client computer and/or graphical user interface 300 may display to the user table 305, schedule 400, legend 402, and/or view 600.

Server computer 702 may comprise one or more server computers and/or one or more load balancers. Server computer 702 may comprise a networked computer that acts as a server to one or more clients, such as client computer 700. Server computer 702 may receive requests for data and may respond with data. Server computer 702 may be owned and/or managed by one or more independent entities and may span across one or more computer networks, such as the Internet. Additionally or alternatively, server computer 702 may respond with data that references data on server computer 702 and/or another computer.

In an embodiment, server computer 702 is communicatively coupled to multiple client computers corresponding to one or more media executives, one or more scheduling engineers, and/or one or more production engineers. The one or more media executives may input parameters for one or more media channels. The one or more scheduling engineers may review and approve promotion schedules and/or promotions. The one or more production engineers may make the promotions to be placed in the promotion schedules. Thus, server computer 702 may centrally manage and/or provide a standardized interface for managing a promotional campaign from its conception by the one or more media executives to its delivery into media production infrastructure 718. Each of the aforementioned users may have different permission levels that restrict user interaction with server computer 702. In an embodiment, permission levels may differ based on a user group. For example, server computer 702 may manage user access in such a manner (e.g., via an authentication protocol) that a production engineer is unable to change a promotion schedule.

Processing logic 704 may receive the one or more parameters for the promotional campaign, the one or more user-specified constraints 602, and/or the one or more confirmed placements from client computer 700. Processing logic 704 may send the one or more parameters for the promotional campaign and/or the one or more user-specified constraints 602 to scoring logic 710. The one or more parameters for the promotional campaign and/or the one or more user-specified constraints 602 may identify promotion 212, a plurality of media channels for the promotional campaign, target promotion frequency 604, and/or target consumption level 606. Processing logic 704 may send the one or more confirmed placements to placement logic 712.

Media program and promotion metadata storage 706 may be a database, a configuration file, and/or any other system and/or data structure that stores data. Media program and promotion metadata storage 706 may be on a separate device from server computer 702. Additionally or alternatively, media program and promotion metadata storage 706 may be a data structure stored in memory on the one or more computers comprising, at least in part, server computer 702. Additionally or alternatively, media program and promotion metadata storage 706 may, at least in part, be a data structure stored in shared memory between one or more computers. Additionally or alternatively, media program and promotion metadata storage 706 may be, at least in part, non-volatile storage. Media program and promotion metadata storage 706 may store information about media program 206, promotion 212, and/or a promoted media program. The information may comprise genre data 208, a promotion length, media channel 204, and/or a time window associated with the presentation of media program 206, promotion 212, and/or the promoted media program.

Conversion prediction logic 708 may retrieve media consumption data 200 and/or demographic data 210 from consumer data storage 716. Conversion prediction logic 708 may also retrieve information about media program 206, promotion 212, and/or the promoted media program from media program and promotion metadata storage 706. Conversion prediction logic 708 may generate media consumption data 200 based on the information retrieved from media program and promotion metadata storage 706. Conversion prediction logic 708 may calculate conversion probability 214 and/or conversion prediction 310 based on the information from consumer data storage 716 and/or media program and promotion metadata storage 706. For example, different weights may be allocated to different subsets of the information from consumer data storage 716 and/or media program and promotion metadata storage 706. Conversion prediction logic 708 may send conversion probability 214 and/or conversion prediction 310 to scoring logic 710.

Scoring logic 710 may generate a score based on information from processing logic 704 and/or conversion prediction logic 708. Scoring logic 710 may send the score to placement logic 712.

Placement logic 712 may automatically determine unconfirmed placement 304, first set of unconfirmed placements 500, and/or second set of unconfirmed placements 504 based on an optimization algorithm. Placement logic 712 may also generate table 305 for unconfirmed placement 304. Furthermore, placement logic 712 may rank unconfirmed placement 304, first set of unconfirmed placements 500, and/or second set of unconfirmed placements 504. When client computer 700 sends one or more confirmed placements to server computer 702, placement logic 712 may re-execute the optimization algorithm.

Tracking logic 714 may receive one or more confirmed placements from placement logic 712. Tracking logic 714 may retrieve information regarding the one or more confirmed placements from consumer data storage 716 and/or media production infrastructure 718. Tracking logic 714 may generate and send view 600 to client computer 700.

Consumer data storage 716 may be a database, a configuration file, and/or any other system and/or data structure that stores data. Consumer data storage 716 may be on a separate device from server computer 702. Additionally or alternatively, consumer data storage 716 may be a data structure stored in memory on the one or more computers comprising, at least in part, server computer 702. Additionally or alternatively, consumer data storage 716 may, at least in part, be a data structure stored in shared memory between one or more computers. Additionally or alternatively, consumer data storage 716 may be, at least in part, non-volatile storage. Consumer data storage 716 may comprise media consumption data 200 and/or demographic data 210. Consumer data storage 716 may be owned by a separate independent entity, such as Nielsen.

Media production infrastructure 718 may process the one or more confirmed placements from server computer 702. Media production infrastructure 718 may execute the wishes of the user as indicated by the one or more confirmed placements. Media production infrastructure 718 may notify server computer 702 and/or client computer 700 when an unscheduled opportunity for presentation of a promotion manifests. Server computer 702 may automatically determine one or more confirmed placements if the user is unable to respond to the unscheduled opportunity in a timely manner.

In an embodiment, server computer 702 may be communicatively coupled to one or more other data storages not depicted in FIG. 7. For example, server computer 702 may be configured to receive finance and/or sales data from one or more media channels. The finance and/or sales data may be used by tracking logic 714 to generate view 600.

Figure 13A:
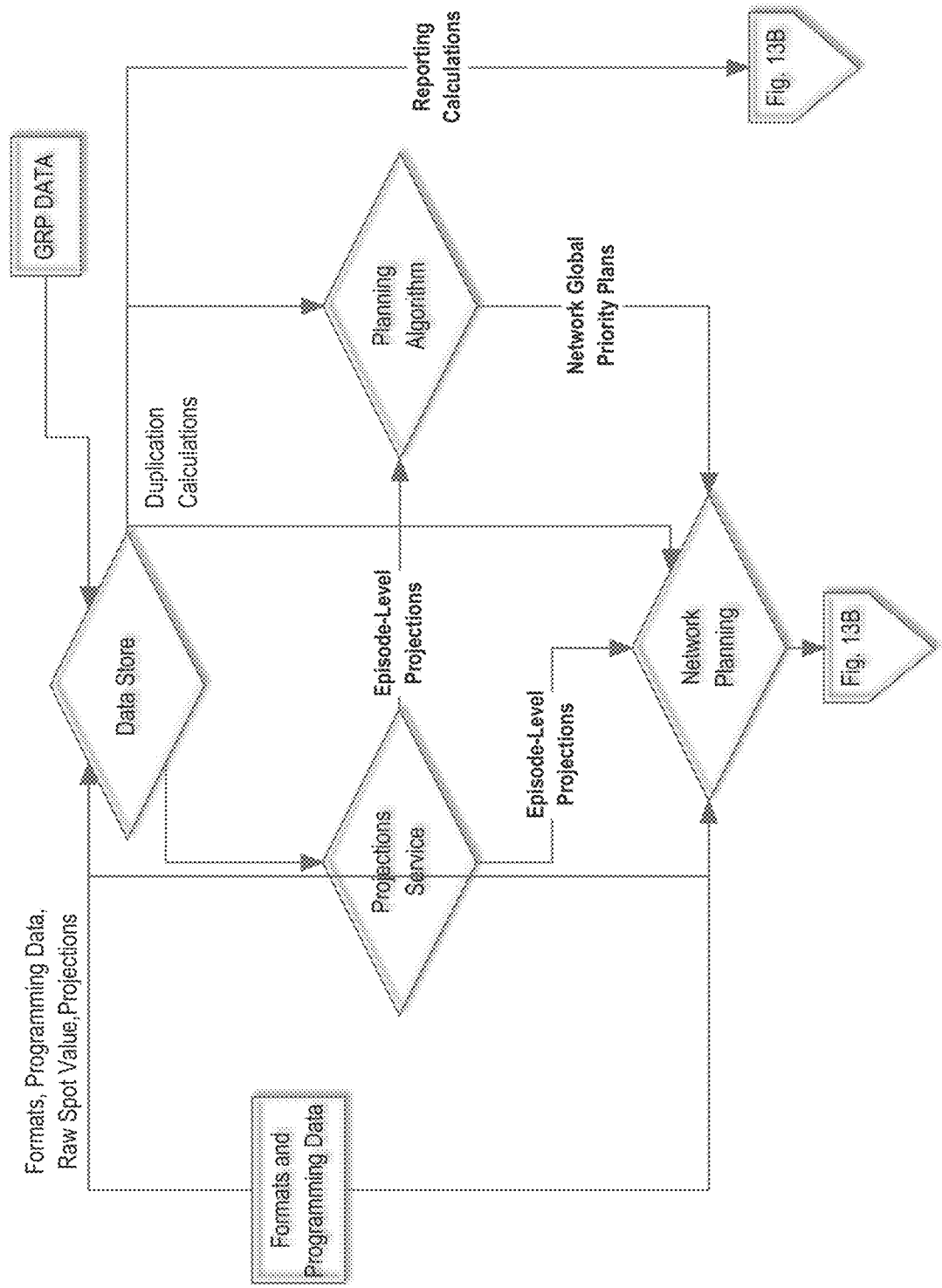
FIG. 13A, FIG. 13B is a two-part illustration of an example program architecture and data flows that may be used in an embodiment.
Figure 13B:
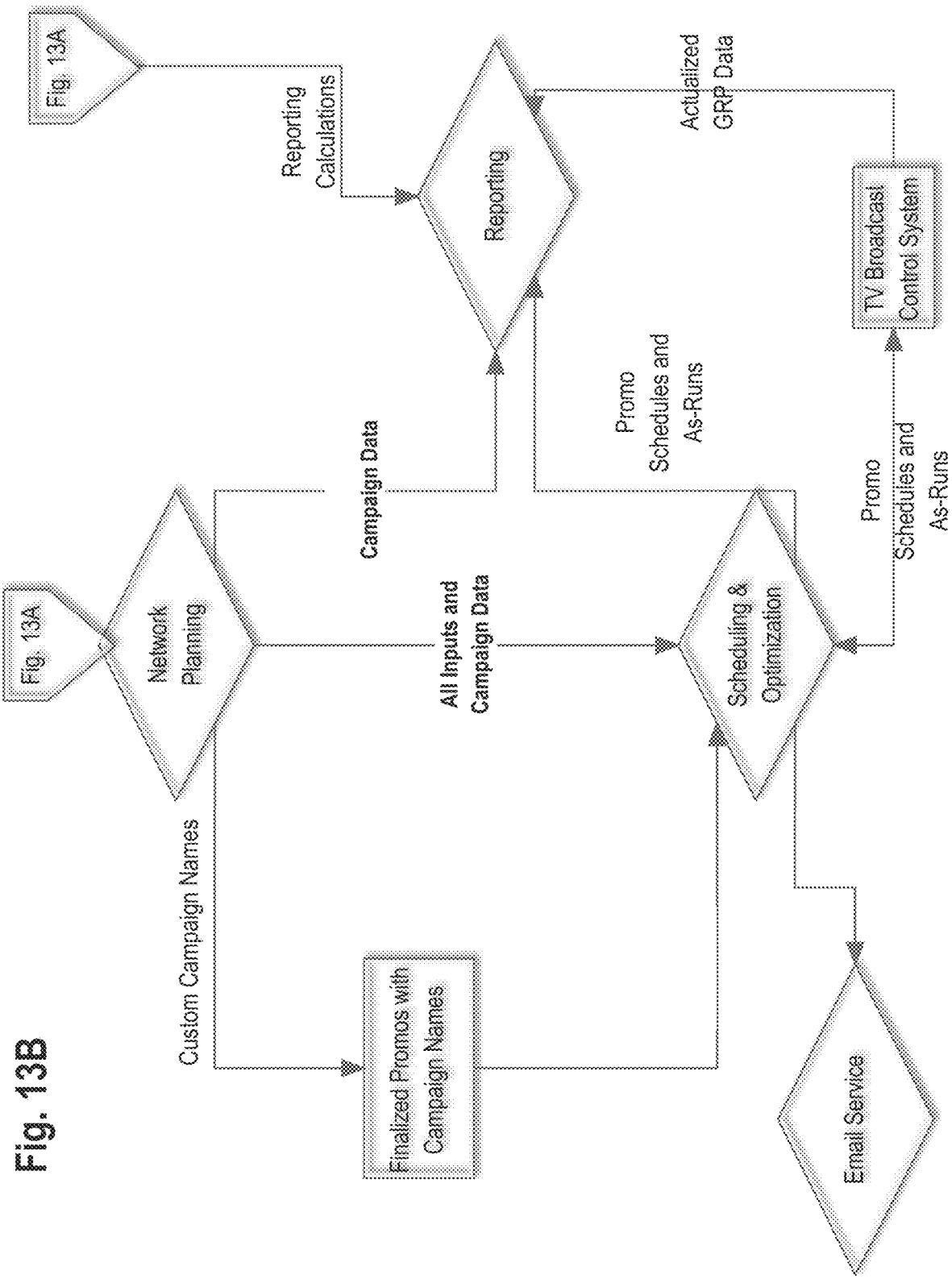
Figure 14:
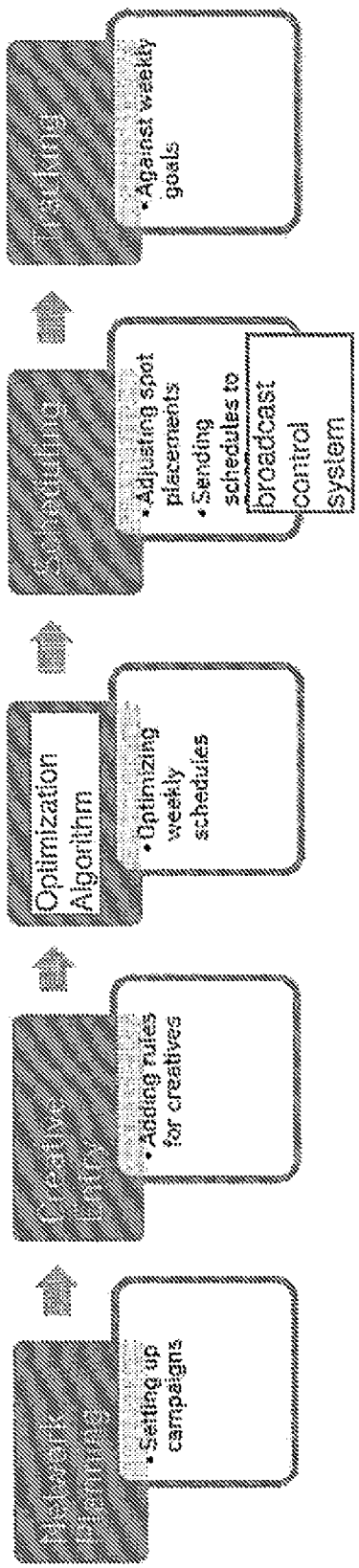
FIG. 14 illustrates an overview of operations that may be used in a workflow in an embodiment.

FIG. 13A-30 illustrate example software architecture, data flows, operations and graphical user interface display screens that may be programmed in an embodiment to provide data displays, receive user input and show results of programmed algorithms that comprise the system. Everything illustrated and described in connection with this section 3.5 relates to one example embodiment or implementation and other embodiments may vary from the specific architecture, data flows, workflow and graphical user interface that is described in this section. FIG. 13A, FIG. 13B is a two-part, self-explanatory illustration of an example program architecture and data flows that may be used in an embodiment. FIG. 14 illustrates an overview of operations that may be used in a workflow in an embodiment. In an embodiment, end-to-end promo optimization can be grouped into sections denoted Network Planning, Creative Entry, Optimization, Scheduling and Tracking. Network Planning generally involves setting up campaigns. Creative Entry comprises adding rules for creatives. Scheduling refers to adjusting spot placements and sending schedules to a separate television broadcast control system, such as the PACE system. Tracking refers to evaluating system performance against weekly goals and displaying results. FIG. 15-30 are further discussed in subsequent sections.

3. Functional Overview of Example Programmed System

Figure 10:
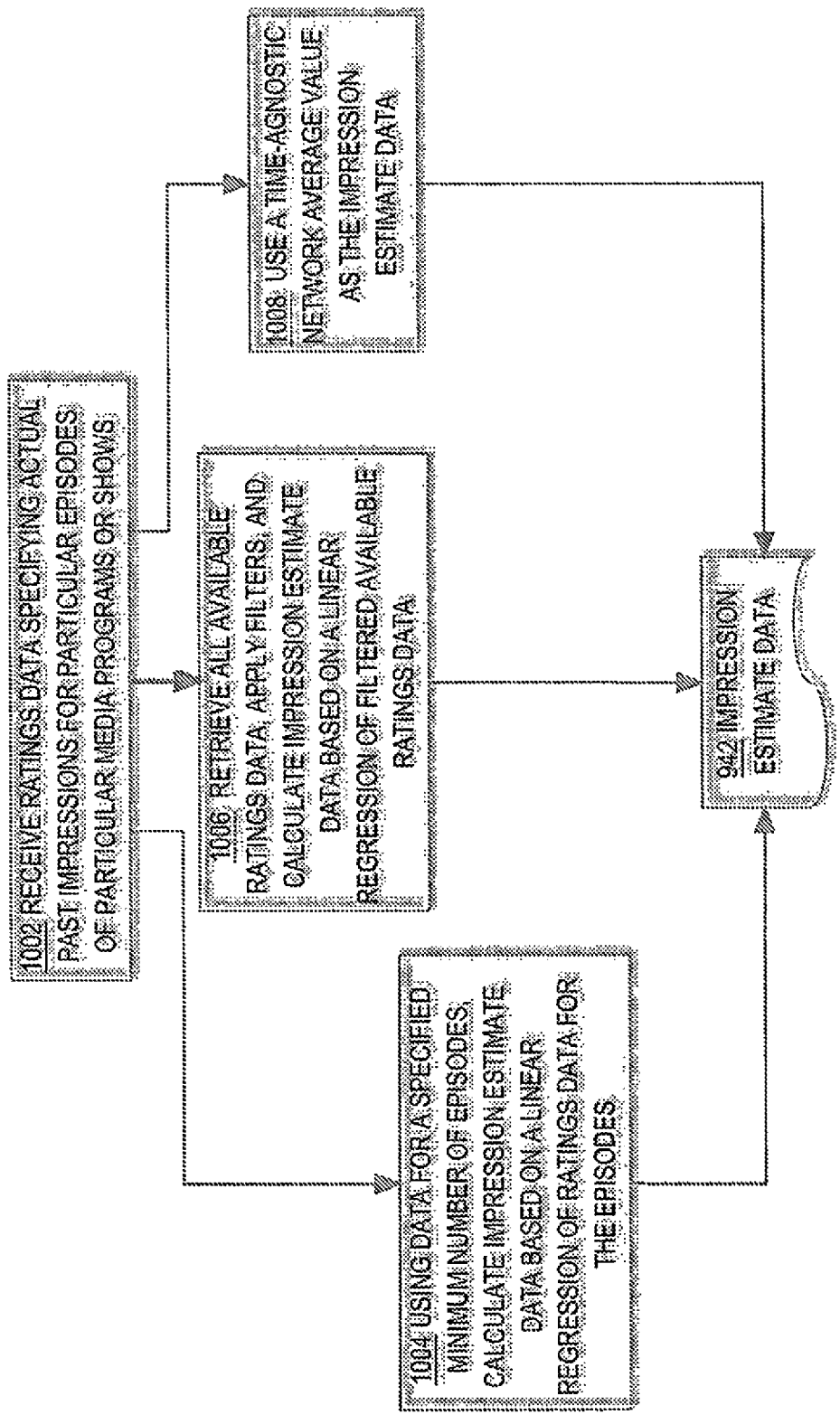
FIG. 10 is a flow diagram illustrating a process that may serve as an example algorithm for implementing projection instructions.
Figure 11:
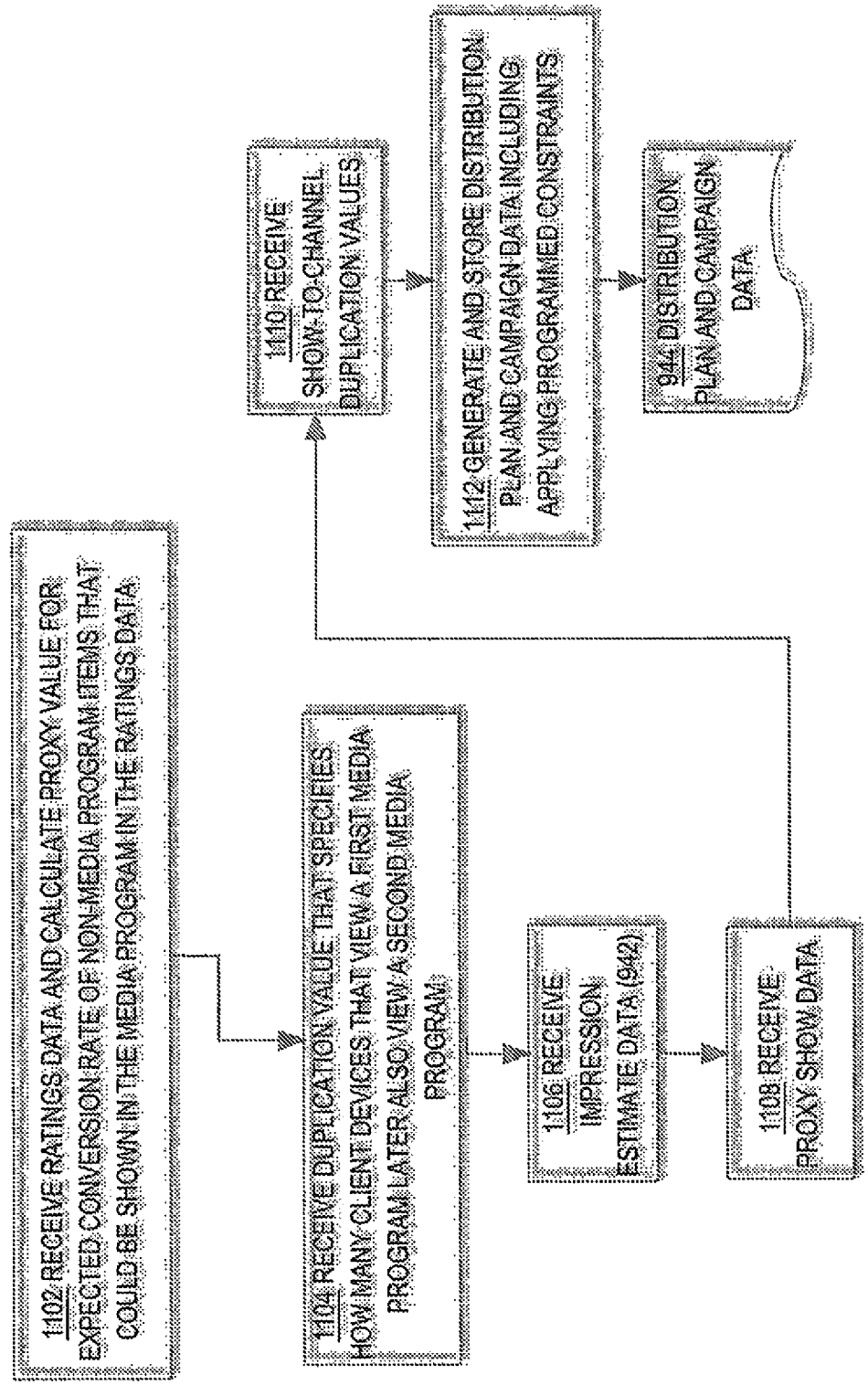
FIG. 11 is a flow diagram illustrating a process that may serve as an example algorithm for implementing planning instructions.

For purposes of illustrating a clear example of data processing functions that can be used in an embodiment, the description herein refers to example algorithms as shown in FIG. 10, FIG. 11, FIG. 12. Each of FIG. 10, FIG. 11, FIG. 12, and each other flow diagram in this disclosure illustrates an algorithm or plan for programming executable instructions which, when executed by processors such as server computer 904, cause performing the functions that are depicted. Each of FIG. 10, FIG. 11, FIG. 12, and each other flow diagram in this disclosure is expressed at the level of detail that the inventors and their peers in industry normally use for communicating the structure and function of computer programs that can be used to implement the operational principles that are illustrated herein and shown in the drawings.

3.1 Projection Instructions

Referring again to FIG. 9, in an embodiment, projection instructions 920 receive input from consumer data storage 716 and generate impression estimate data 942 as output. More specifically, in an embodiment, projection instructions 920 are programmed to estimate a number of impressions that a given program episode will actually receive, in terms of actual viewership by televisions or computing devices, when aired or broadcast in a particular network; complexity and additional target accuracy may be achieved from impression estimates for varying demographic categories. An example category is women age 18-34. The estimated number of actual impressions can be used to estimate how many impressions of non-program media items should be planned or scheduled across a plurality of different networks that are owned or operated by a single entity. Thus, the estimated number of actual impressions can be used to cap or fix the number of impressions of non-program media items that should be given to each network among a plurality of different networks.

FIG. 10 is a flow diagram illustrating a process that may serve as an example algorithm for implementing the projection instructions. At block 1002, the process receives ratings data specifying actual past impressions for particular episodes of particular media programs or shows. In an embodiment, the ratings data is received from the consumer data storage 716 at server computer 904 and comprises one or more digital data items that specify, for a particular episode of a particular media program, a number of actual impressions that occurred for that episode in the past. As an example, the ratings data received at block 1002 may comprise data from the NIELSEN ratings service, directly or indirectly from a proxy or processor. Ratings data may specify impressions, episode by episode, in association with demographics data values for the audience that resulted in the specified impressions numbers. Block 1002 may be implemented as an API call, a database query, or using other programmatic messaging to obtain data from the consumer data storage 716.

Blocks 1004, 1006, 1008 represent processing options that may be used in a descending order of priority from 1004 to 1008.

At block 1004, projection instructions 920 are programmed to obtain data for a specified minimum number of prior episodes of the show and to calculate impression estimate data 942 using a linear regression of the ratings data for the episodes. For example, data from four (4) prior episodes has been found useful to calculate a workable linear regression; in other embodiments, data for other numbers of episodes may be used. The data may be associated in a database using a program master value that reflects the name or title of the program, airtime and air day; these values typically are sufficient to disambiguate ratings values for different programs. An example might be {NCIS, 07:00 PM, WEDNESDAY}; based on such a tuple the ratings data is inspected to identify the specified number of ratings values for the program NCIS shown at 7:00 PM on Wednesdays. Using the linear regression, the process selects impression estimate data 942 (FIG. 9), which is a value indicating how many impressions an episode should receive in the future. The particular linear regression algorithm that is used may be one of those known in the art.

At block 1006, which is used when data for the specified minimum number of episodes is not available, the process retrieves all ratings data that is available, applies one or more filters, and calculates a linear regression based on the filtered data. In an embodiment, the one or more filters may be programmed to select, for example, other episodes that air at approximately the same time slot, on the same day of week, at the same time of year, or using other criteria. Air time, air date, and time of year may be subject to windows or ranges to constrain selection of data. For example, if four (4) ratings values for {NCIS, 07:00 PM, WEDNESDAY} are not available, the instructions could search the ratings data for records matching {NCIS} but with airtimes of 03:00 PM to 11:00 PM, and air days of TUESDAY, WEDNESDAY, THURSDAY, FRIDAY. Or, all programs of all titles that are aired at 7:00 PM on Wednesday could be used. Using the linear regression, the process selects an estimate value indicating how many impressions an episode is likely to receive. This approach may result in over-fitting the regression, but is useful, for example, when the system has a relatively small dataset at a startup point of operation.

At block 1008, projection instructions 920 are programmed to use a time-agnostic network average value as an estimate of the number of impressions that an episode will receive. In an embodiment, this approach is used only when insufficient data is available or stored to use the approaches of blocks 1004, 1006. Typically, as the system develops more data, block 1008 will be invoked less often over time and eventually almost never.

Thereafter, the impression estimate data 942 resulting from one of the foregoing approaches is stored or otherwise provided as output for use by planning instructions 922 and/or other elements of the system, as further described. The result of FIG. 10 thus represents a forward estimate of the number of impressions that a particular media program should receive in the future based on analysis of past actual impressions. The impression estimate data 942 then can be used as a basis for planning the future insertion of non-media program items in media programs across a plurality of different networks.

3.2 Planning Instructions

FIG. 11 is a flow diagram illustrating a process that may serve as an example algorithm for implementing the planning instructions.

In an embodiment, various media networks may request certain impressions of non-program media items for shows that they want to have promoted across networks in a particular legal entity or company. The planning instructions 922 are programmed to obtain or retrieve such requests and to generate an optimized plan for the impressions to be distributed to the networks in the company. As seen in FIG. 9, planning instructions 922 receive input from consumer data storage 716 and the impression estimate data 942 that was generated using one of the approaches described above for projection instructions 920. Planning instructions 922 also may receive requests as user input.

Referring again to FIG. 11, at block 1102, the process receives ratings data from consumer data storage 716 and calculates a proxy value for an expected conversion rate of non-media program items that could be shown in a media program such as an episode that is represented in the ratings data. In an embodiment, block 1102 involves obtaining NIELSEN data to calculate a proxy value for an expected conversion rate for promotional non-program media items. "Conversion rate," in this context, refers to the rate at which computer devices that view a particular non-program media item then also view the media program that is described or promoted in that particular non-program media item.

At block 1104, the process computes or receives a duplication value. In this context, a duplication value specifies how many client devices, such as TVs or computers, which view a first media program or show, later also view a second, different media program or show. The relationship of the two shows as reflected in the duplication value can represent show-to-show duplication, network-to-network duplication, or show-to-network duplication. The inventors have found, in an inventive moment, that the duplication value correlates well with the conversion rate of a particular non-program media item. Therefore, in an embodiment, planning instructions 922 are programmed to use the duplication number to generate a score as a basis for an impression plan. An alternative form of duplication is network-to-network duplication, rather than show-to-show duplication, and can be used in other embodiments. In one embodiment, duplication is computed using viewer level data (e.g. set top box data from Nielsen for linear TV). In this approach, duplication between two programs is the number of viewers that have tuned into each program for N minutes, where N can be variable depending on the program type or other factors. Put another way, duplication is the intersection of viewers that have watched any two programs for at least N minutes. Duplication can also be applied for specific demographics or rating streams in addition to all viewers.

In an embodiment, at block 1106 the process receives the impression estimate data 942 that has been generated by the projection instructions 920.

At block 1108, the process receives proxy show data. In an embodiment, proxy show data specifies proxy shows, which are shows that users typically consider similar to another show that is the subject of insertion of promotions or other non-program media items. For example, THE VOICE might be identified in proxy data as a proxy show for AMERICAN IDOL. Proxy show data is useful for planning insertion of non-program media items into episodes of shows that have never been aired before, for example. For such new shows, there is no historic impression data to rely on, so the impression data for proxy shows can be used.

At block 1110, the process receives show-to-channel duplication values. In an embodiment, show-to-channel (or network) duplication is a useful component in planning as the ultimate value comes from better holistic use of network group inventory. For example, it is preferred to promote a show for an expensive network on a cheaper network where possible, as this is a more efficient use of total inventory. Show-to-channel duplication is useful for optimizing cross-network as it provides information about where the ideal viewers for a show are watching programming on the other networks.

In an embodiment, planning instructions 922 incorporate a set of algorithmic constraints on how output data is generated. The constraints may be obtained from a data store, or from user input, and in either case the constraints may be modified based upon user input or configuration. Each of the constraints may be implemented using programmed instructions organized as constraint operations, functions or methods. For example, the planning instructions 922 may be programmed with limits on how much cross-network airtime is provided for insertion of non-program media items such as promotions. That is, constraints may limit the amount of time that is planned for a promotion, appearing on a first network, of a program that is only shown on a second network. Another constraint may cause increasing the number of insertions of a particular non-program media item relating to a particular show, as the actual show airtime becomes closer. For example, if the air date and time of a particular show is 8:00 PM on Jan. 1, 2017, then programmed constraints may cause planning for a larger number of insertions or more frequent insertions of a non-program media item in the last two weeks, one week, or few days before Jan. 1, 2017. Another constraint may restrict the insertion of a non-program media item too close to the start of a particular program. Another constraint may specify a frequency of placement of a non-program media item within airtimes of a second program over a specified time window. Still another programmed constraint may require that a newly generated distribution plan shall not deviate more than a specified degree from a previously generated distribution plan that is received as input. Each of the constraints may be implemented as a linear expression on a set of variables that form part of a quadratic optimization algorithm.

In one embodiment, the constraints comprise a priority share cap, cross channel cap, and out of family cap. Other embodiments may use more or fewer constraints. The priority share cap may be: for each network, a user or the system can specify the maximum percentage of a network's total airtime for that week can be used to hit targets for priorities. The remaining airtime will be left unallocated. The cross channel (xch) cap may be: the user or system can specify the maximum percentage of all networks' airtime that can be filled with promos for cross channel campaigns. A cross channel campaign is a campaign for a show that airs on a network different from the one it is being promoted on. The out of family cap may be: a user or the system can specify the maximum percentage of all networks' airtime that can be filled with promos for out-of-family campaigns. A "family" may be a set of two or more channels or programming brands that are commonly owned or operated as part of a larger network. Further, there various tuning parameters may be implemented to affect certain soft aspects of the output.

Further, embodiments may implement one or more soft constraints that impose a penalty for excessive deviation from certain desired programmed behavior. As one example, a programmed soft constraint may cause reducing the number of different-channel programs that are promoted, once a specified percentage of such programs is reached. As another example, a programmed soft constraint may enforce the goal of increasing exposure of a campaign over time, while concurrently refraining from a fixed rate of increase, so that the system still can achieve greater efficiency in optimization calculations without a hard rate of increase. As another example, the target impressions for a campaign may be implemented as a soft constraint.

In an embodiment, at block 1112, as output, the process generates and stores a distribution plan and campaign data 944 (FIG. 9). The distribution plan may be digital data forming a set of instructions to each network specifying what to promote and how much to promote it; the plan data may comprise allocations of particular non-program media items to amounts of air time and channels. The distribution plan may be fed directly to the scheduling instructions 924 for placement, as described in section 3.3 below. The campaign data may comprise stored digital data representing time budgets that have been created by the planning algorithm and that include values such as the amount of impressions that are to be hit for a given show and identifiers of the non-media program items that are to be shown as part of a campaign.

3.3 Scheduling Instructions

FIG. 12 is a flow diagram illustrating a process that may serve as an example algorithm for implementing the scheduling instructions. In an embodiment, scheduling instructions 924 are programmed generally to determine how to place specific non-program media items in timeslots for a given week.

In one approach, at block 1202, the scheduling instructions 924 are programmed to receive data specifying a weekly media program schedule including channel, time, date, and description data for particular media programs, and a specification of a plurality of available slots for inserting non-program media items. At block 1204, the scheduling instructions 924 are programmed to receive data specifying a target number of total impressions that output data is expected to achieve. The target number may form part of the distribution plan and campaign data 944 that is generated using the planning instructions 922. At block 1206, the scheduling instructions 924 are programmed to access, via storage 906, data describing the non-program media items that can be placed for each show that is represented in the weekly media program schedule.

Based on these data values, the scheduling instructions 924 are programmed at block 1208 to calculate every permutation or combination of timeslot, non-program media item, and campaign specifying a target number of impressions, and to calculate an optimized schedule at block 1210. A score value may be calculated for the optimized schedule to compare whether the schedule has achieved the target number of impressions. In an embodiment, the score is based on values for duplication, demographic values that indicate how well the schedule should match a certain audience demographic characteristic, and specificity. The duplication value reflects show-to-show duplication in this context. The demographics values reflect characteristics of viewing audiences that are associated with particular duplication values. The specificity values represent certain factors that do not take into account audience optimization; for example, a second show that is aired immediately after a first show would likely need to be promoted during the first show using a "COMING UP NEXT . . . " type of non-program media item, and that "COMING UP NEXT" non-program media item would supersede all other types of non-program media items.

Scheduling instructions 924 also may implement one or more other constraints. For example, the scheduling instructions 924 may be programmed not to schedule insertion of the same non-program media item more than one time during the same show. Such a constraint, or others, can be retrieved from stored data or received via user input.

Block 1212 indicates that the result of block 1210 may be a filled programming schedule that specifies non-program media items and the timeslots in which they may be inserted in media programs. In an embodiment, the filled schedule may be graphically displayed in the graphical user interface 300 via the presentation layer 928. The filled schedule may be viewed using a user computer, audited and corrected, or simply transmitted downstream to networks, programmers, or other computers or parties involved in executing the insertion schedule at airtime. In some embodiments, the filled schedule may comprise digital data in a transportable data format, such as JSON blobs, that can automatically drive, directly or indirectly through an integration system, broadcast equipment to select, play back, and transmit over a network the specified non-program media items at the days and times specified in the filled schedule.

3.3.1 Scheduling Promotions Across Multiple Media Channels.

In an embodiment, a method may comprise calculating, for a plurality of timeslots across a plurality of media channels, one or more probabilities, for a promotion associated with a media program, to convert one or more non-consumers of the media program into one or more consumers of the media program. The method may also comprise determining, based on the one or more probabilities, a first set of unconfirmed placements, for the promotion, in one or more of the plurality of timeslots. Additionally, the method may comprise assigning one or more confirmed placements for the promotion based on the first set of unconfirmed placements.

The method may further comprise displaying the first set of unconfirmed placements in a graphical user interface. Further, the method may comprise determining a second set of unconfirmed placements based on the one or more confirmed placements. Still further, the method may comprise monitoring consumption of the promotion in the one or more confirmed placements.

The one or more probabilities may be determined based on media consumption data associated with the one or more non-consumers. Additionally or alternatively, the one or more probabilities may be determined based on demographic data associated with the one or more non-consumers. Additionally or alternatively, the one or more probabilities may be determined based on genre data associated with the media program. Additionally or alternatively, the one or more probabilities may be determined based on revenue data and/or advertising data associated with one or more particular timeslots.

The first set of unconfirmed placements may be optimized based on one or more user-specified constraints comprising, for example, a target promotion frequency or a target consumption level for the promotion. The first set of unconfirmed placements may be associated with the promotion and one or more alternative promotions. The first set of unconfirmed placements may be associated with one or more comparison metrics comprising a revenue opportunity cost, a demographic correlation, a conversion prediction, a promotion frequency, or a temporal proximity to the media program. The first set of unconfirmed placements may comprise one or more of a plurality of ranked timeslots. The plurality of ranked timeslots may comprise a plurality of colors.

3.3.2 Scheduling Promotions.

FIG. 1 is a flow diagram that depicts an approach for automatic promotion scheduling across multiple media channels. In step 100, one or more probabilities for a promotion associated with a media program to convert one or more non-consumers of the media program into one or more consumers of the media program are calculated for a plurality of timeslots across a plurality of media channels. The promotion may advertise a first media program. The plurality of timeslots may be advertising spots, such as blocks of time before, during, and/or after a time when a media program (e.g., the first media program, a second media program, a third media program) is presented to an audience. The plurality of timeslots may be associated with different media channels. A server computer may calculate the one or more probabilities for the promotion to cause conversion of one or more non-consumers of the first media program into consumers of the first media program. For example, a probability may be calculated for each of the plurality of timeslots. The one or more probabilities may be based on a comparison between the first media program and one or more media programs associated with the plurality of timeslots.

In step 102, a set of unconfirmed placements for the promotion in one or more of the plurality of timeslots is determined based on the one or more probabilities for the plurality of timeslots. The set of unconfirmed placements may be a subset (e.g., all, some, none) of the plurality of timeslots. The server computer may automatically determine the set of unconfirmed placements. The set of unconfirmed placements may represent optimal placements for the promotion relative to unconfirmed placements for one or more other promotions. For example, the server computer may simultaneously schedule unconfirmed placements for multiple promotions based on balancing competing parameters of the multiple promotions. The set of unconfirmed placements may be an output of an optimization algorithm. The optimization algorithm may take as input the one or more probabilities, a programming schedule (e.g., a television guide), revenue optimization, and/or one or more user-specified constraints, such as a target promotion frequency and/or a target consumption level for the promotion.

In step 104, one or more confirmed placements for the promotion are assigned based on the set of unconfirmed placements. The set of unconfirmed placements may be displayed to a user via a graphical user interface. The graphical user interface may simultaneously display the set of unconfirmed placements in each of the plurality of media channels. The graphical user interface may display a view of the set of unconfirmed placements that corresponds to one of the plurality of media channels. The graphical user interface may display a view of the set of unconfirmed placements that corresponds to one or more particular timeframes, such as a monthly view, a weekly view, and/or a daily view. The user may designate one or more of the set of unconfirmed placements as the one or more confirmed placements for the promotion.

In step 106, a determination is made regarding whether assigning confirmed placements is finished. A determination that the user wishes to continue assigning confirmed placements leads to step 102. If the user wishes to continue assigning confirmed placements, the user may send a request to the server computer to execute the optimization algorithm again. The request may include the one or more confirmed placements to be provided as input to the optimization algorithm. For example, the one or more confirmed placements may be added to the programming schedule that is taken as input to the optimization algorithm. Additionally or alternatively, the user may wish to assign confirmed placements for a different promotion, in which case the process may lead to step 100 and/or step 102.

A determination that the user is finished assigning confirmed placements may lead directly to step 108. Additionally or alternatively, the determination that the user is finished assigning confirmed placements may lead to making the confirmed placements available to another user for reviewing and/or editing prior to proceeding to step 108. If the user is finished assigning confirmed placements, the user may send a notification and/or an instruction to the server computer. For example, the instruction may be to close the view of the set of unconfirmed placements.

In optional step 108, consumption of the promotion in the one or more confirmed placements is monitored. The server computer may send the one or more confirmed placements to one or more of the plurality of media channels. The one or more of the plurality of media channels may present media programs and/or promotions according to a schedule that is updated with the one or more confirmed placements. The server computer may process information that is collected regarding the one or more confirmed placements, such as an actual promotion frequency and/or an actual consumption level for the promotion. The information may be displayed to the user via the graphical user interface. Based on the information, the user may wish to edit the one or more confirmed placements, in which case the process may lead to step 100 and/or step 102.

3.3.3 Calculating Conversion Probabilities.

Figure 2:
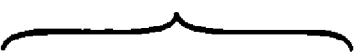
FIG. 2 is a table that depicts an approach for determining conversion probabilities.

FIG. 2 is a table that depicts an approach for determining conversion probabilities. In the example of FIG. 2, the table comprises columns corresponding to media consumption data 200, genre data 208, demographic data 210, promotion 212, and conversion probability 214. Media consumption data 200 further comprises columns corresponding to time 202, media channel 204, and media program 206.

Media consumption data 200 may be behavioral information associated with one or more audience members at a particular time and/or a particular timeframe. The behavioral information may comprise media channel 204 that the one or more audience members are tuned into at point in time 202. The behavioral information may comprise media program 206 that is presented on media channel 204 at point in time 202. The one or more audience members may comprise a sample set of audience members. The particular time and/or the particular timeframe may comprise real time, a periodic point in time, and/or an interval of time. For example, Nielsen ratings may provide one or more media channels that the sample set of audience members are tuned into every minute. Combined with information from a programming schedule, such as a television guide, the Nielsen ratings may provide one or more media programs that are being consumed by the sample set of audience members.

Time 202 may correspond to a point before, during, and/or after the presentation of media program 206. Time 202 may correspond to an unscheduled and/or scheduled opportunity to present promotion 212. For example, time 202 of "15:34:00" may correspond to a break in "Show A" that is intended for advertisements. Additionally or alternatively, time 202 may correspond to a timeout in a game represented by "Show A". Multiple versions of a promotion schedule (e.g., a set of confirmed placements for one or more promotions) may be generated in case of such unscheduled events. For example, a rain delay schedule may be generated in such a manner that a queue of promotions and/or media programs fills in a time period corresponding to an originally scheduled media program. Additionally or alternatively, a cancellation schedule may be generated in such a manner that a schedule of promotions and/or media programs fills in the time period corresponding to the originally scheduled media program. In an embodiment, multiple versions of promotion schedules are maintained for each promotion schedule.

Media channel 204 may correspond to a particular television channel, a particular radio station, a particular online digital stream, and/or any other particular mode of continuous one-way communication of media content. Media channel 204 may be constrained to a band of frequencies and/or one or more Uniform Resource Locators (URLs).

Media program 206 may be media content that is primarily presented (e.g., in terms of time) in a particular block of time on media channel 204. Media program 206 may exclude advertisements. Media program 206 may be regularly recurring media content, such as a television series and/or a radio show. Media program 206 may be a one-time event, such as a particular episode in the television series, a particular basketball game in a tournament, and/or a particular presidential debate. Media program 206 that is consumed may be determined based on time 202, media channel 204, and the programming schedule.

Genre data 208 may be information describing one or more categories for media program 206. For example, genre data 208 may indicate that media program 206 belongs in the "Action" and "Drama" categories. Genre data 208 may be metadata for media program 206 and may be obtained from a metadata source, such as Internet Movie Database (IMDb).

Demographic data 210 may be information describing one or more audience members. For example, demographic data 210 may include gender, age, annual income, and/or race. Demographic data 210 may be associated with media program 206 and/or promotion 212. For example, demographic data 210 may indicate a target audience for media program 206 and/or promotion 212. Demographic data 210 may be aggregated into one or more audience profiles. For example, the Nielsen ratings may include media consumption data 200 and demographic data 210 for the sample set of audience members. Based on the Nielsen ratings, predictions may be made for audience members who share an audience profile with one or more of the sample set of audience members. In the example of FIG. 2, demographic data 210 describes one or more audience members presently consuming media program 206.

Promotion 212 may be an advertisement for another media program. Promotion 212 may be assigned to a timeslot associated with media program 206. Promotion 212 may be assigned to a timeslot during a break in the presentation of media program 206. Additionally or alternatively, promotion 212 may be assigned to a timeslot during the presentation of media program 206. For example, promotion 212 may be a banner located at the bottom of the television screen that is presently displaying media program 206. In the example of FIG. 2, promotion 212 indicates the other media program being advertised during the presentation of media program 206.

Conversion probability 214 may be a likelihood of causing one or more non-consumers of a particular media program to become consumers of the particular media program. The one or more non-consumers may be determined based on demographic data 210, genre data 208, media channel 204, and/or time 202. For example, demographic data 210 for "Show A" and "Show D" indicates that some of the audience members of "Show A" are non-consumers of "Show D". Based on similarities between consumers of "Show D" and consumers of "Show A" who are also non-consumers of "Show D", conversion probability 214 of 25.8% may be calculated. In another example, "Show B" and "Show C" may be presented on different media channels at the same time. Thus, Nielsen ratings may provide information about consumers and non-consumers of "Show B" every minute.

3.3.4 Example Unconfirmed Placements.

Figure 3:
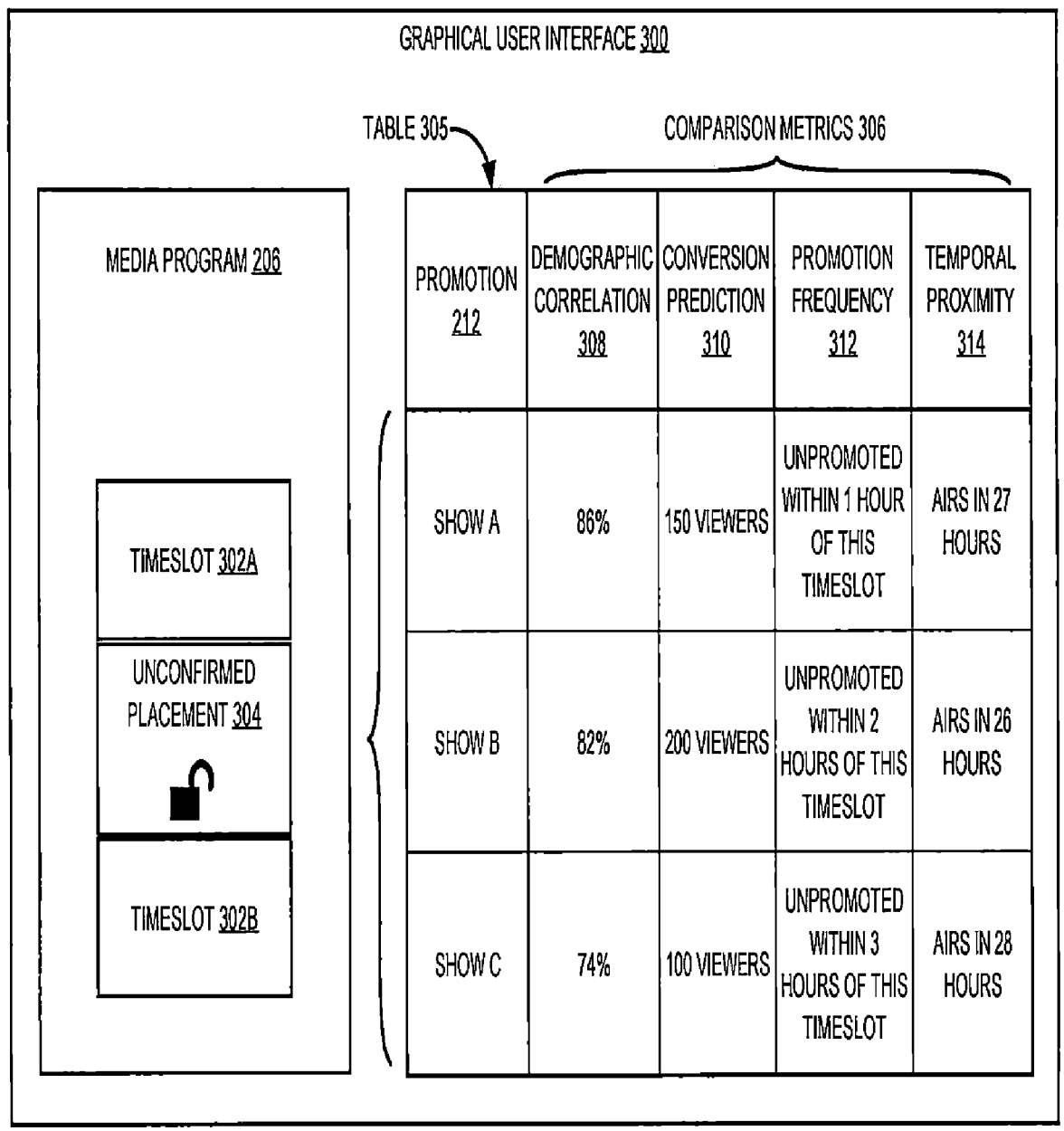
FIG. 3 depicts a detailed view of unconfirmed placements, in an example embodiment.

FIG. 3 depicts a detailed view of unconfirmed placements, in an example embodiment. In the example of FIG. 3, graphical user interface 300 displays timeslot 302A, 302B and unconfirmed placement 304 within media program 206. Unconfirmed placement 304 is displayed with a table 305 comprising promotion 212 and comparison metrics 306. Comparison metrics 306 further comprises demographic correlation 308, conversion prediction 310, promotion frequency 312, and temporal proximity 314.

Graphical user interface 300 may comprise a set of instructions in a computer that allows a user (e.g., a scheduling engineer) to enter commands and/or interact with data. For example, graphical user interface 300 may be a browser and/or any other user agent that displays a schedule of media programs and promotions. In another example, graphical user interface 300 may provide information about promotions (e.g., lengths of promotions, average lengths of promotions) and consumption (e.g., ratings, number of audience members) across a plurality of media channels. In yet another example, graphical user interface 300 may recommend promotions and/or sort information by media program 206, promotion 212, length of promotion 212, and/or timeslot 302A, 302B.

Timeslot 302A, 302B may correspond to an unscheduled and/or scheduled opportunity to present promotion 212. In an embodiment, each timeslot 302A, 302B that is available for scheduling may be simultaneously filled with multiple promotions based on balancing competing parameters for the multiple promotions. Timeslot 302A, 302B may be a time window before, during, and/or after the presentation of media program 206. Additionally or alternatively, timeslot 302A, 302B may be a time window before, during, and/or after a break in the presentation of media program 206. Timeslot 302A, 302B for promotion 212 may dynamically adapt to a schedule of media programs. For example, a block of time associated with media program 206 may be thirty-two minutes in length, and timeslot 302A, 302B may be anywhere during the thirty-two minute block of time.

Unconfirmed placement 304 may represent a recommendation to place a promotion 212. For example, in FIG. 3, unconfirmed placement 304 may be "Show A". Unconfirmed placement 304 may be automatically determined based on a score comprising conversion probability 214 and/or comparison metrics 306. The score may represent a single metric that encompasses a variety of factors. For example, "Show A", "Show B", and "Show C" may have scores of "97.3", "92.3", and "87.1", respectively. When the user selects unconfirmed placement 304, a predetermined number of promotions maybe displayed. The predetermined number of promotions may comprise alternatives to unconfirmed placement 304.

Comparison metrics 306 may comprise factors used to determine unconfirmed placement 304. Comparison metrics 306 provide the user with reasons for assigning a particular promotion to a particular timeslot. Comparison metrics 306 may be used to override the automatic determination of unconfirmed placement 304 with an alternative. For example, the user may replace "Show A" in unconfirmed placement 304 with "Show B" based on information indicating that "Show A" was recently advertised.

Demographic correlation 308 may indicate a degree of overlap between demographic data 210 associated with media program 206 and demographic data 210 associated with promotion 212. For example, in FIG. 3, "Show A" has an 86% demographic match with media program 206.

Conversion prediction 310 may estimate the number of non-consumers that will be influenced to become consumers. Conversion prediction 310 may be based on conversion probability 214 and/or media consumption data 200, such as an estimated number of audience members who will consume media program 206. Conversion prediction 310 may be represented by a percentage of audience members and/or an estimated number of converted audience members.

Promotion frequency 312 may indicate the proximity of another placement (e.g., another unconfirmed placement and/or a confirmed placement) for a particular promotion that is closest in time to unconfirmed placement 304 on the same media channel and/or on a different media channel. For example, in FIG. 3, a confirmed placement for promotion 212 of "Show A" may have been assigned in a timeslot 302A, 302B that is one hour after unconfirmed placement 304.

Temporal proximity 314 may indicate the length of time between unconfirmed placement 304 and the presentation of a promoted media program. For example, in FIG. 3, temporal proximity 314 indicates that "Show A" will air in twenty-seven hours from unconfirmed placement 304.

3.3.5 Example Ranked Timeslots.

FIG. 4 depicts an example of ranked timeslots comprising different colors. In the example of FIG. 4, graphical user interface 300 displays a schedule 400 and a legend 402 comprising rank 404 and color 406.

Schedule 400 may provide a view of the set of unconfirmed placements that corresponds to a particular timeframe, such as a daily view, a weekly view, and/or a monthly view. Additionally or alternatively, schedule 400 may provide a view of the set of unconfirmed placements that corresponds to one or more of the plurality of media channels. In the example of FIG. 4, schedule 400 provides a weekly view of timeslots in a media channel 204.

Legend 402 may provide explanations for symbols used in schedule 400. In the example of FIG. 4, legend 402 associates rank 404 with color 406.

Rank 404 may indicate how optimal a particular unconfirmed placement is for a particular promotion. For example, a rank 404 of "1" may indicate the best unconfirmed placement, and a rank 404 of "2" may indicate the next best unconfirmed placement.

Color 406 may indicate rank 404 using a variety of colors. For example, a "heatmap" may be created using a spectrum of colors in which the hot color of "red" indicates the best unconfirmed placement and the cool color of "blue" indicates the worst unconfirmed placement.

3.3.6 Re-Optimizing Unconfirmed Placements.

Figure 5:
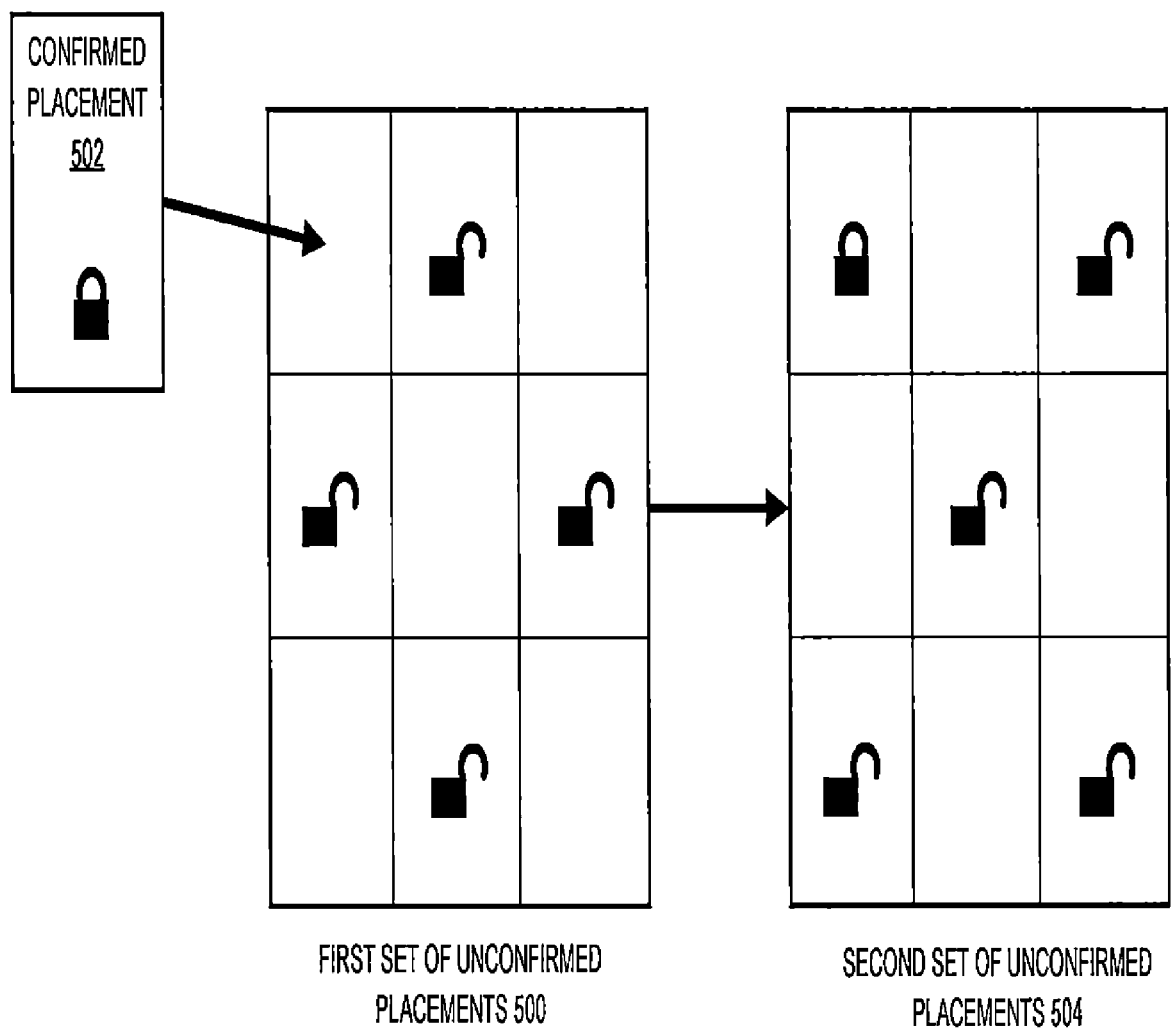
FIG. 5 depicts an approach for determining unconfirmed placements based on confirmed placements.

FIG. 5 depicts an approach for determining unconfirmed placements based on confirmed placements. In the example of FIG. 5, confirmed placement 502 is assigned to an available timeslot based on first set of unconfirmed placements 500, which is subsequently transformed into second set of unconfirmed placements 504. The available timeslot may be associated with an unconfirmed placement for a different promotion. For example, each of the nine available timeslots in the example of FIG. 5 may have been simultaneously filled with unconfirmed placements for multiple promotions. Confirmed placement 502 may be assigned to any of the nine available timeslots in FIG. 5, regardless of whether a different promotion has been recommended for a particular available timeslot.

First set of unconfirmed placements 500 is represented in FIG. 5 by a plurality of icons indicating an "unlocked" status for a plurality of boxes representing timeslots. The "unlocked" status may indicate that a particular unconfirmed placement is changeable. For the sake of clarity, some of the timeslots in FIG. 5 are depicted as empty boxes. However, in an embodiment, each of the empty boxes may be associated with an unconfirmed placement for one or more other promotions.

Confirmed placement 502 may be assigned to one or more of first set of unconfirmed placements 500. For example, the user may interact with unconfirmed placement 304 to confirm a recommended promotion or to select an alternative promotion. Continuing with the example, when the user clicks a "Save" button, an icon indicating a "locked" status may indicate that unconfirmed placement 304 has been changed to confirmed placement 502.

Second set of unconfirmed placements 504 may represent the result of re-optimization based on confirmed placement 502. In the example of FIG. 5, the boxes representing unconfirmed placements have been re-distributed among the timeslots. For example, unconfirmed placements are no longer adjacent to confirmed placement 502.

In an embodiment, the unconfirmed placements may automatically become confirmed placements in the absence of user interaction with the unconfirmed placements.

For example, when a user exits a promotion schedule displayed in graphical user interface 300, any unconfirmed placements may automatically become confirmed placements. Thus, user input that selects confirmed placements may include a set of instructions triggered by an event handler that listens for the user's exiting the promotion schedule.

3.3.7 Tracking Promotional Campaigns.

FIG. 6 depicts an approach for monitoring promotion consumption. In the example of FIG. 6, graphical user interface 300 provides view 600 comprising promotion 212, user-specified constraints 602, actual promotion frequency 608, and actual consumption level 610. User-specified constraints 602 comprises target promotion frequency 604 and target consumption level 606.

View 600 may allow the user (e.g., one or more media executives) to monitor one or more promotional campaigns in one or more of the plurality of media channels over a particular timeframe, such as a daily basis, a weekly basis, and/or a monthly basis. View 600 may comprise a graphical and/or a tabular representation of monitored data. In the example of FIG. 6, view 600 may simultaneously provide information about three different promotions in the same media channel.

User-specified constraints 602 may correspond to one or more parameters for the one or more promotional campaigns. User-specified constraints 602 may be provided by one or more media executives overseeing one or more media channels. Unconfirmed placement 304 may be determined based on user-specified constraints 602. Unconfirmed placements may be concurrently determined for multiple promotions based on balancing user-specified constraints 602 associated with the multiple promotions. For example, if a total available GRPs (e.g., 1000) is less than a sum of target GRPs for the multiple promotions (e.g., 500 and 1500), unconfirmed placements for the multiple promotions may be determined in such a manner that the actual GRPs for the multiple promotions are proportionately reduced (e.g., 250 and 750). In an embodiment, balancing user-specified constraints 602 may involve prioritizing user-specified constraints 602 into multiple tiers. The multiple tiers may represent different demographics. For example, GRPs related to audience members who are children may be prioritized lower than GRPs related to young adults. In an embodiment, balancing user-specified constraints 602 may involve a preference for a first media channel over a second media channel. For example, Show A may be allocated more GRPs than Show B based on a preference for a media channel associated with Show A over a different media channel associated with Show B.

Target promotion frequency 604 may be a desired frequency with which promotion 212 is to be presented. For example, if the user specifies target promotion frequency 604, first set of unconfirmed placements 500 and/or second set of unconfirmed placements 504 may be spaced by time intervals corresponding to target promotion frequency 604.

Target consumption level 606 may be based on a desired number of times promotion 212 is to be presented. Target consumption level 606 may be specified in terms of GRPs and/or a number of audience members.

Actual promotion frequency 608 may be information regarding the time intervals separating confirmed placements for promotion 212. Actual promotion frequency 608 may be represented as an average, a median, a mode, a range, and/or any other statistical measurement.

Actual consumption level 610 may be information related to the number of times promotion 212 is presented. Actual consumption level 610 may be represented as GRPs, a number of audience members, and/or a percentage of target consumption level 606.

In an embodiment, view 600 may also assist the user in making revenue optimization decisions. For example, an opportunity cost associated with promotion 212 may be presented to the user. The opportunity cost may represent a value of one or more timeslots associated with media program 206 and promotion 212. The value of the one or more timeslots may be determined based on revenue generated by non-promotional advertisements placed in timeslots associated with media program 206. The value of the one or more timeslots may also be determined by one or more lengths of the one or more timeslots. For example, the value of a thirty-second promotion for Show A that is placed within a presentation of Show B may be determined by averaging the advertising revenue generated by thirty-second non-promotional advertisements also placed within the presentation of Show B. The opportunity cost may be presented to the user as an aggregate opportunity cost for promotion 212.

3.4 Reporting Instructions

In an embodiment, reporting instructions 926 are programmed to generate records and/or visual reports that are based on actual viewership of non-media program items that have been projected, planned and scheduled as previously described, and then actually aired or broadcast using the media production infrastructure. As seen in FIG. 9, reporting instructions 926 are coupled to consumer data storage 716 to receive consumer data specifying the number of actual impressions that were provided for particular non-media program items at airtime.

For example, NIELSEN rating data may be received via consumer data storage 716 that specifies the number of televisions, computers or other displays devices that actually viewed or were tuned into a particular media program that contained non-program media items that had been projected, planned and scheduled as specified herein. This data thus represents actual viewing of the non-program media items that were scheduled, and may be used as a basis to determine how many actual impressions were provided for a given campaign and can be used to compare the performance of the networks and the filled schedule to the target impression numbers. Thus the reporting instructions 926 serve to validate or audit the projecting, planning and scheduling operations that were previously executed, as part of a feedback loop.

In an embodiment, reporting instructions 926 are programmed to provide output in the form of a web-based dashboard that may be transmitted via presentation layer 928 to the graphical user interface 300 of client computer 700. Additionally or alternatively, reports may be transmitted using presentation layer 928 via an e-mail server to reach an e-mail in-box of the client computer 700, or other systems; the use of a separate or independent presentation layer is optional and may be omitted in some embodiments.

In various embodiments, reporting instructions 926 are programmed to specify which networks are contributing to campaigns that have been planned as part of distribution plan and campaign data 944, and to calculate estimated costs of airing non-program media items. Using this approach, reporting instructions 926 can help audit that all the networks are cross-promoting as expected. In some cases, the data output from the reporting instructions 926 can be fed back to the planning instructions 922 and/or projection instructions 920 to better inform the calculations that have been previously described.

3.5 Example Graphical User Interface Implementation

Figure 15:
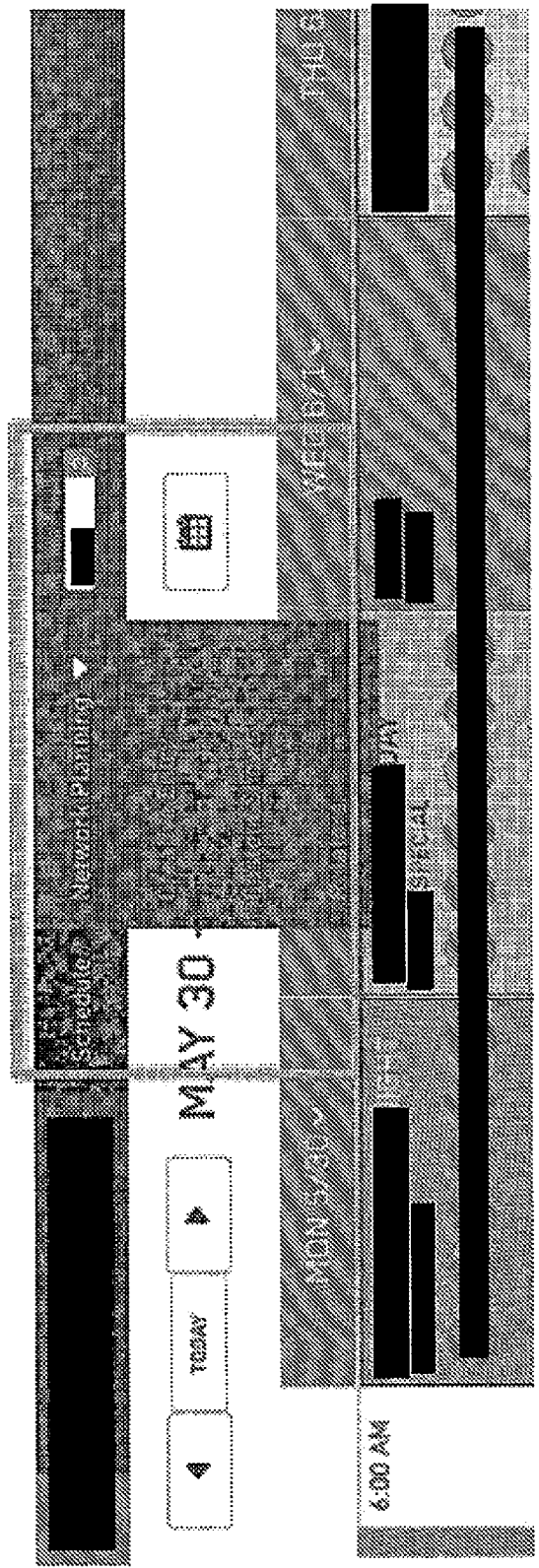
FIG. 15 illustrates an example graphical user interface screen display that is programmed to support navigating within the system.

FIG. 15 illustrates an example graphical user interface screen display that is programmed to support navigating within the system. In an embodiment, graphically navigating, via user input in a graphical user interface, to different sections of the workflow can be performed using a navigation bar at the top of the screen. A channel dropdown may be used to toggle between different channels. A Network Planning menu may be selected to navigate to a Network Planning page for the selected network, where campaigns can be created and edited for both on-channel and cross-channel. Hovering a cursor over Network Planning and, in the dropdown, selecting Creative Entry causes navigating to a Creative Entry page, where rules and creative weights can be added to content items that are identified by Industry Standard Coding Items (ISCIs). Hovering over Network Planning and, in the dropdown, selecting Custom Shows causes navigating to the Custom show creation page. These Campaign Names populate into a separate system such as On-Air Pro for adding to work orders, which then flow back to the disclosed system as ISCIs that are associated with a campaign name. Hovering over Network Planning and, in the dropdown, selecting Rotators causes navigating to a Rotators page. Rotators can be used for contractual commitments that need to be placed in specific spots before the optimization algorithm optimizes the remainder of the schedule. Selecting Schedule causes navigating the Week View and Day View schedules. The Week View schedule provides a high-level view of what is on the schedule for the week; the Day View can be used to manually adjust placements by the optimization algorithm.

Figure 16:
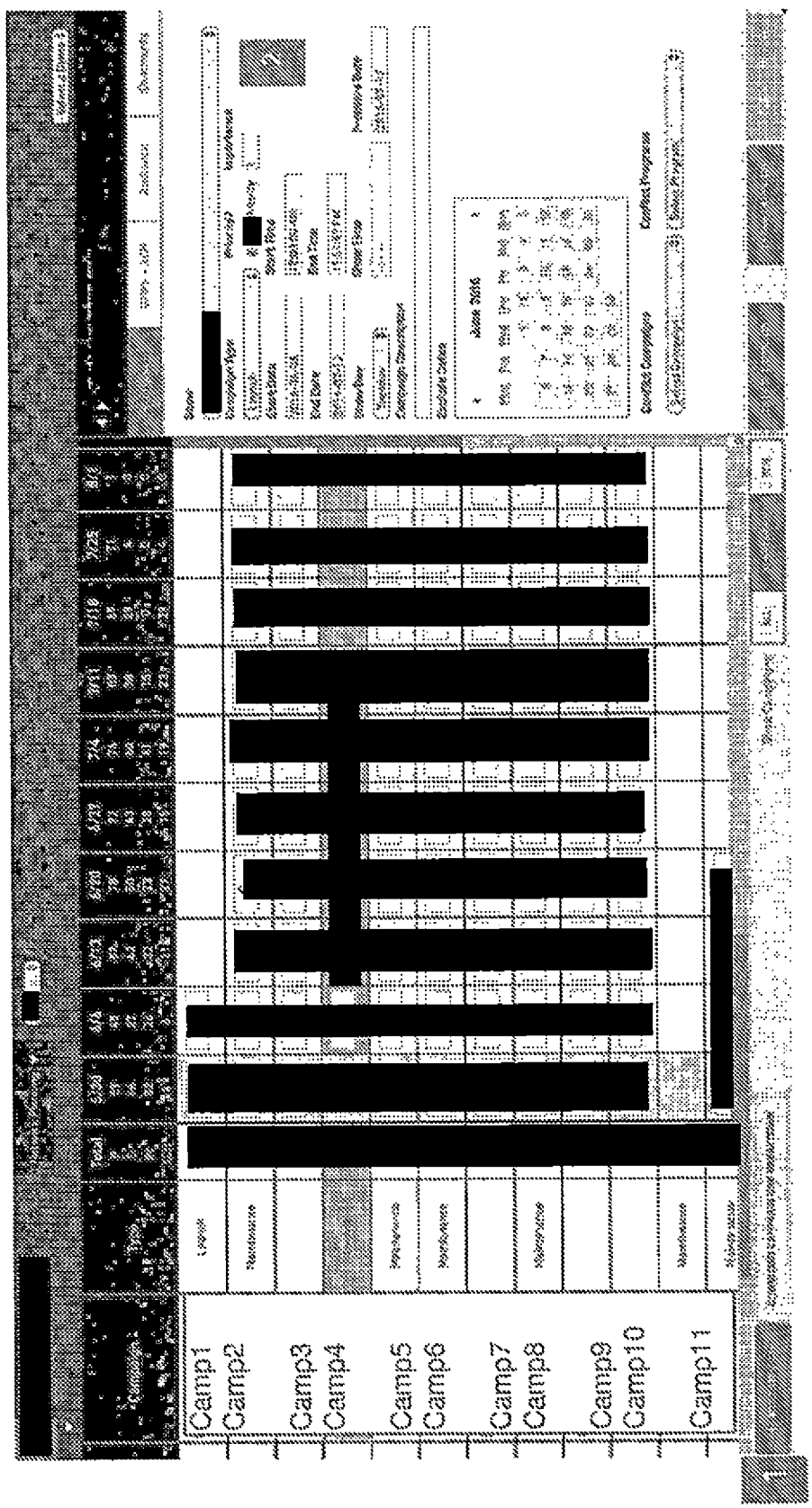
FIG. 16 illustrates an example graphical user interface screen display that is programmed for adding a campaign.

The Network Planning stage of the workflow of FIG. 14 comprises setting up campaigns. For consistency and tracking, all placements in the system are associated with a campaign. The Network Planning page can be used to add new campaigns, adjust campaign audience targeting, and view weekly plans of existing campaigns, both on-channel and cross-channel; all the foregoing elements are represented using stored digital data that is manipulated using programmed algorithms as now described. FIG. 16 illustrates an example graphical user interface screen display that is programmed for adding a campaign. At numeral 1, selecting an Add Campaign button is performed to create a new campaign. Custom Show Names that have been created on the Custom Shows page are displayed as options with which to create campaigns. At numeral 2, campaign data is entered into the right-hand details panel. In an embodiment, campaign information includes: 1. Show Name, Campaign Type, Priority Status (is the campaign a network-wide priority), Importance Level (should the algorithm aim to prioritize this campaign over others when making placements) Start and End Dates and Times, Show Day and Show Time (not required), and Premiere Date (not required). 2. Select days on the Exclude Dates calendar to prevent the optimization algorithm from placing promos for that campaign on those dates. 3. Select campaigns in the Conflict Campaigns dropdown to prevent the optimization algorithm from placing promos for both campaigns within the same break. 4. Select programs in the Conflict programs dropdown to prevent the optimization algorithm from placing promos for that campaign within that program.

Figure 17:
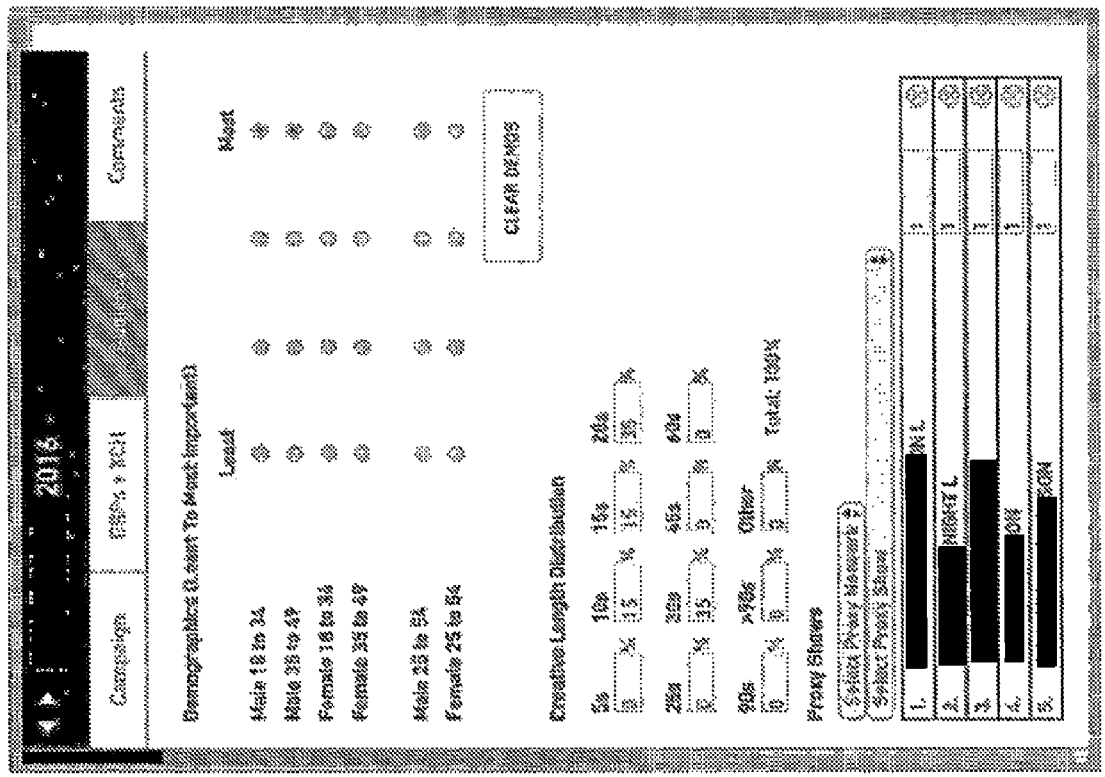
FIG. 17 illustrates an example graphical user interface screen display that is programmed to support adjusting audience targeting.

FIG. 17 illustrates an example graphical user interface screen display that is programmed to support adjusting audience targeting, which may be performed as part of Network Planning. To adjust the targeted audience for the campaign, input is received to switch to the Audience tab and to select relevant demographics for the optimization algorithm to target using the radio buttons. Input may select as many radio buttons as needed. The Creative Length Distribution for the campaign is entered, to instruct the optimization algorithm what lengths will be available. Enter 0% for any lengths that will not have creative cut or for which the optimization algorithm should not place. To aid in optimization, select proxy shows for the campaign using the Select Proxy Network dropdown followed by the Select Proxy Show dropdown. Optional weighting for the proxy shows can be added to the right of each show.

Figure 18:
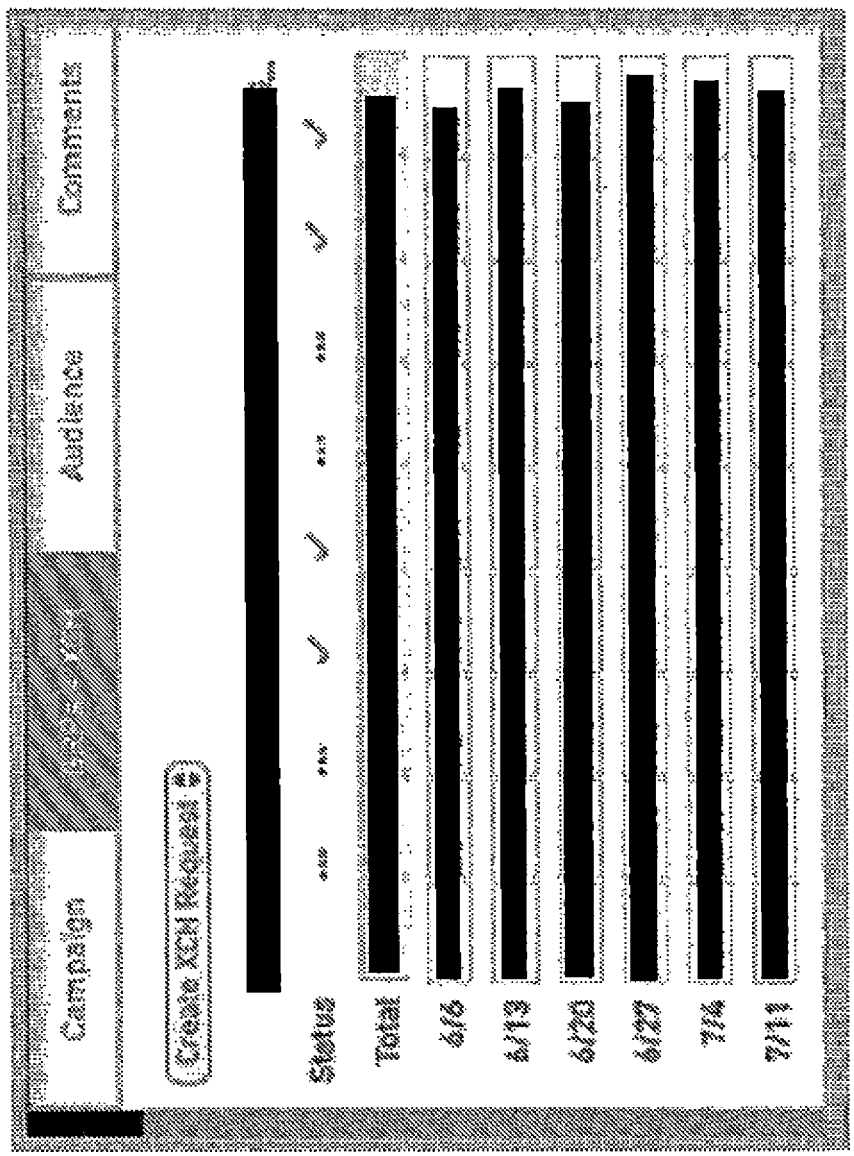
FIG. 18 illustrates an example graphical user interface screen display that is programmed to support making on-channel plans and cross-channel requests.

FIG. 18 illustrates an example graphical user interface screen display that is programmed to support making on-channel plans and cross-channel requests, which may be performed as part of Network Planning. To add on-channel plan targets and make cross-channel requests, input specifies switching to the GRPs+XCH tab after completing the Campaign tab. To create an on-channel plan, input specifies one or more GRP targets for the current Channel for each week. To make a cross-channel request using the Create XCH Request dropdown, user input specifies the requested XCH networks; for each network, input specifies weekly GRP targets in the week columns.

Network Planning also can include creating or updating a campaign by selecting Create Campaign in the bottom left once input for the campaign information is complete; Update Campaign is selected to make an update. In an embodiment, campaign information always can be edited during the length of the campaign. When XCH support is requested, all campaign information is automatically sent to the XCH networks Network Planning page.

The Rotators page may be used to set up placement of specific ISCIs in the log before the optimization algorithm optimizes the schedule. Rotators are rule-based, rather than based on optimization, and provide a placement system that can be helpful for ensuring that contractual commitments get hit before other campaigns are placed on the log. The graphical user interface screen display of FIG. 15 can be used to access functions for adding a rotator. In an embodiment, adding a rotator comprises entering a name for the rotator campaign, then selecting the length of promos that are within that rotator campaign. User input next specifies whether to place the rotators only in national time, or in any available time slot. Input then specifies the number of spots that are needed. A maximum per day, if applicable, may be entered. A break number for which the rotators are to be placed each time, if applicable, is entered. Input then chooses whether the rotators are only to be placed in the A position (first position) of each break, or in any position in the break. Input selects the ISCIs that are part of the rotator campaign and a minimum separation in minutes between each rotator, if applicable. Valid start and end times and days for the campaign are input, and days of the week also can be selected. Input then specifies a SAVE operation after all relevant information has been filled out.

The Creative Entry stage of the workflow of FIG. 14 begins with adding rules to ISCIs for placement and adding ISCIs to campaigns. In an embodiment, the optimization algorithm automatically uses flight dates and navigational tags from a TV broadcast control system, and additional day and time range rules can be added to ISCIs on the Creative Entry page to further restrict placements, via the optimization algorithm, for specific ISCIs. Creative Weights also can be added to ISCIs on this page to inform the optimization algorithm which ISCIs are to be aired more than others for a given promo length within a campaign.

Figure 19:
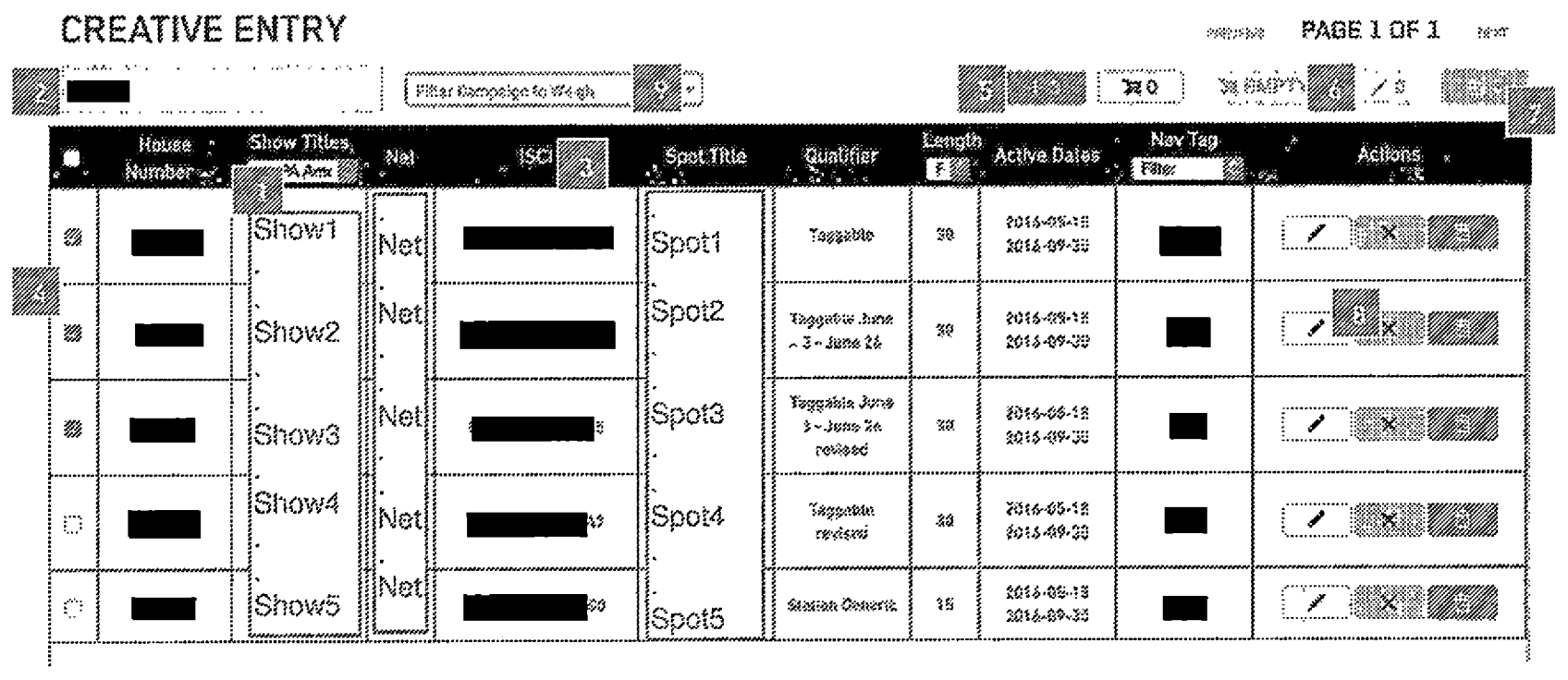

FIG. 19 illustrates an example graphical user interface screen display that is programmed to select ISCIs for editing and adding to a campaign. Due to the number of creatives, there are multiple ways to drill down and/or filter the ISCIs to the desired list. At numeral 1 in FIG. 19, input can select the campaign of interest under the Show Titles dropdown to filter down to just promos of that campaign. At numeral 2, the search bar can be used to provide input to search by any field that is available. Or, using numeral 3, input can select the header of any column to sort the data by that column.

Once the data is filtered down to the desired ISCI list, input can select and edit the group of ISCIs that are needed. Editing ISCIs can be done either individually, by selecting the edit icon for the individual creative, or in bulk by selecting the edit icon at the top right of the page after promos have been added to the mass-editing cart.

At numeral 4 of FIG. 19, input can select checkboxes to select ISCIs to be edited together with the same rules. At numeral 5, selecting the add (+) icon causes adding all selected promos to the cart. At numeral 6, selecting the edit icon causes launching the promo editor window. At numeral 7, if needed, a delete (trash can) icon can be selected to cause erasing all rules from the selected promos in the cart. At numeral 8, if needed, a permanent delete (X) icon can be selected to permanently delete the promo from the creative grid. Numeral 9 indicates a dropdown that shows only the promos that have been marked as active creative for a campaign. These are the only promos for each campaign that will be placed by the optimization algorithm, as well as available to select in the Day View dropdowns.

Executing the optimization algorithm occurs next in the workflow of FIG. 14. The algorithm generates a globally optimal schedule, based on show duplication, over a 1-week period and seeks to maximize promo conversion potential. The algorithm executes based on a selection of inputs that may be viewed as data or features. Data comprises: a traffic API, which supplies a programming schedule and promo availability data; ratings projections, which estimate the audience for a program; duplication from ratings data such as Nielsen AMRLD data, which identifies shows that share similar audiences. Features comprise campaign features, creatives features, and promo time slot features. Campaign features comprise dates, lengths of available promo creative, weekly GRP targets, desired demographic skew, and proxy shows. Creatives features comprise flight dates, navigational tags, and clearance rules. Promo time slot features comprise program start time and duration, break number, projected ratings, duplication against proxy shows, and proximity to program. Output from the optimization algorithm is schedule data representing an air schedule that satisfies each campaign's GRP goals and target audiences as effectively as possible over a 1-week period. The optimization algorithm can be executed multiple times if schedules need to be re-optimized during a 1-week period. Other embodiments may use periods other than 1-week for optimization. The optimization algorithm also will split spots in the format as needed. For example, it may split a 45-second avail into a 30-second avail and a 15-second avail. In an embodiment, distinctive coloring or other visual identification is used in a display of the resulting schedule to identify an avail that the optimization algorithm has split.

Figure 20:
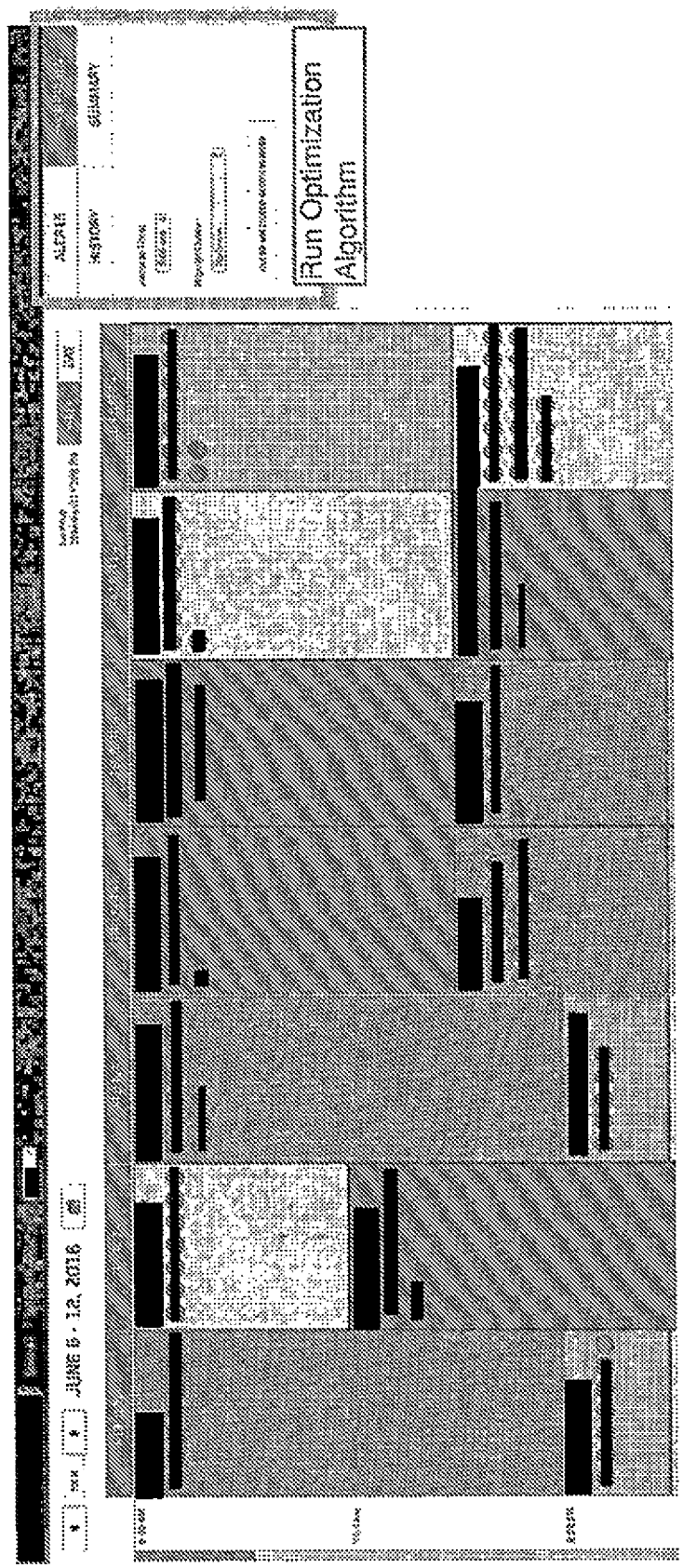
FIG. 20 illustrates an example graphical user interface screen display that is programmed to display results of running a schedule optimization algorithm.
Figure 21:
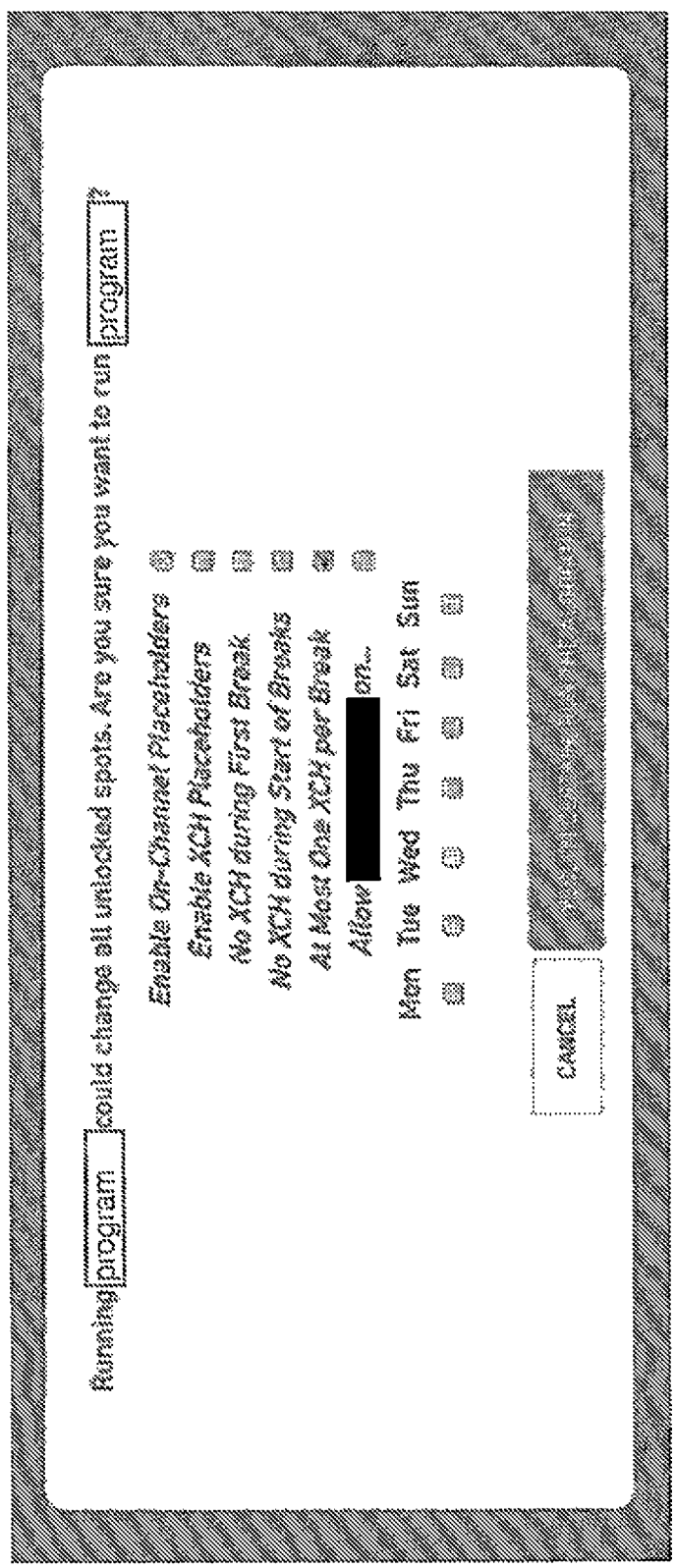
FIG. 21 illustrates an example graphical user interface screen display that is programmed to display a constraints panel.

FIG. 20 illustrates an example graphical user interface screen display that is programmed to display results of running a schedule optimization algorithm. When the optimization algorithm executes, it attempts to fill the schedule for the remainder of the week, less any locked spots. To execute the optimization algorithm, when in the Scheduling page, the Workflow tab is selected followed by selecting Run Optimization Algorithm. In response, the system displays an options window. FIG. 21 illustrates an example graphical user interface screen display that is programmed to display a constraints panel. User input specifies any or all relevant rules and constraints for execution of the optimization algorithm. The constraints that are shown by example in FIG. 21 may be used as follows. Enable On-Channel Placeholders permits the optimization algorithm to place on-channel show placements regardless of whether ISCIs are available. Enable XCH Placeholders permits the optimization algorithm to place cross-channel show placements regardless of whether ISCIs are available. Enable No XCH During First Break prevents the optimization algorithm from placing cross-channel promos during the entire first break of a program, while Enable No XCH During Start of Breaks prevents the optimization algorithm from placing cross-channel promos during the first promo avail of every break; selecting either of these two constraints can, in some cases, prevent the optimization algorithm from fully hitting targets. Enable At Most One XCH Per Break prevents the optimization algorithm from placing more than one cross-channel promo in one break. Enable Allow AFFL/NET/BB fills AFFL/NET/BB time on any selection of days; when this is not selected, the optimization algorithm only will place promos in promo time.

Figure 22:
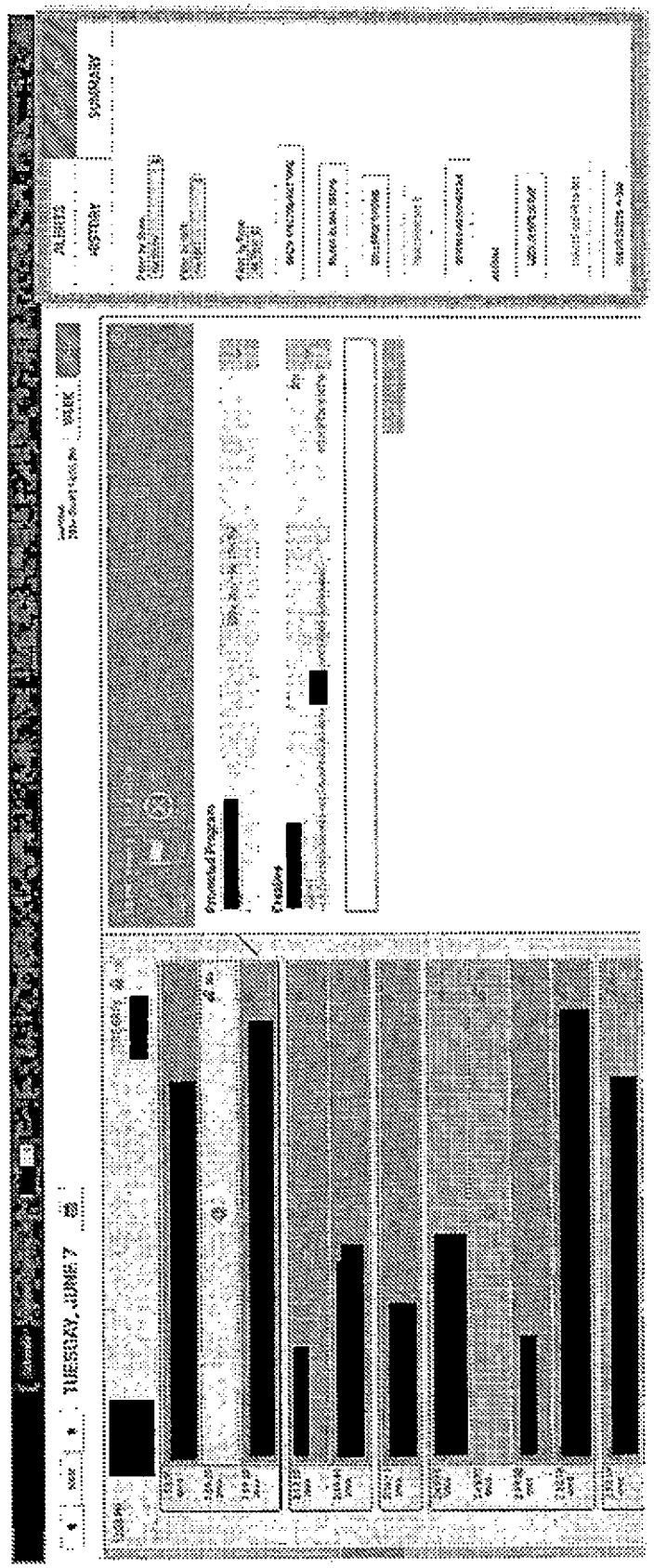
FIG. 22 illustrates an example graphical user interface screen display that is programmed for sending a completed schedule to a broadcast control system.

Sending schedules to a broadcast control system occurs next in the workflow of FIG. 14. Once the optimization algorithm has executed and any manual adjustments have been made, the schedule can be sent to the broadcast control system. Upon a successful transmission, the promo avails are displayed in distinctive coloring, for example, green. If promos are in the disclosed system but not yet in the broadcast control system, then the promo avails are displayed using different distinctive coloring, for example, as blue, or using a third distinctive coloring if the spot has been split. FIG. 22 illustrates an example graphical user interface screen display that is programmed for sending a completed schedule to a broadcast control system. In the Day view, input selects the Workflow tab. There are multiple programmed ways to view and review a schedule before deciding to push the schedule to the broadcast control system. The Day view can be filtered to show only promos of the selected show, selected ISCI, or spot type. Selecting Show (or Hide) AFFL/BB/NET Time can be used to show or hide AFFL/BB/NET time from the schedule. Input also can filter down to only unfilled spots in the schedule and select the Collapse Shows icon to hide all promo avails to view only the program schedule. Once the schedule is reviewed and approved, selecting Send Schedule causes the system to send schedule data to the broadcast control system.

Figure 23:
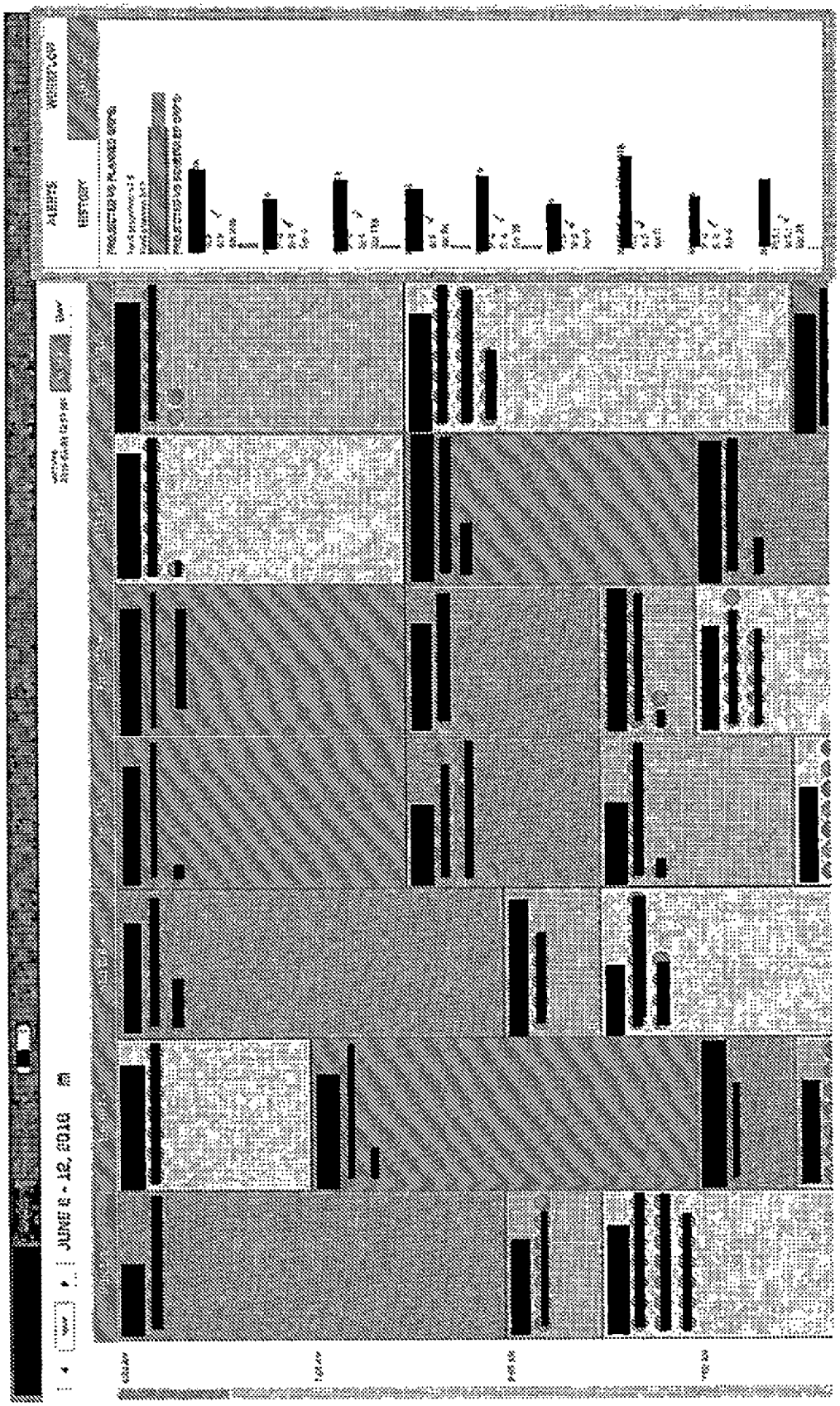
FIG. 23 illustrates an example graphical user interface screen display that is programmed to display results of campaign progress.

Tracking against goals occurs next in the workflow of FIG. 14. The Summary Tab on the Week View and the Day View enables a user to view how campaigns are progressing, using projected GRPs, against their targets for the week to permit intra-week adjustments if needed. FIG. 23 illustrates an example graphical user interface screen display that is programmed to display results of campaign progress. User input selects the Summary Tab on the Week view or the Day view and in response, a display like FIG. 23 is generated. Total Projected shows the projected M18-49 GRPs available for the week. Total Planned shows the total GRPs from the campaign targets that are currently on the Network Planning page for the week. Each campaign that is active on the Network Planning page is listed in the summary tab. (P) shows the total GRP goal for the campaign for the week on the Network Planning Page. (S) shows the total GRPs currently on the schedule for the campaign for the week. (Sp) shows the total number of spots currently on the schedule for the campaign for the week.

3.6 Example Reporting Interface

Figure 24:
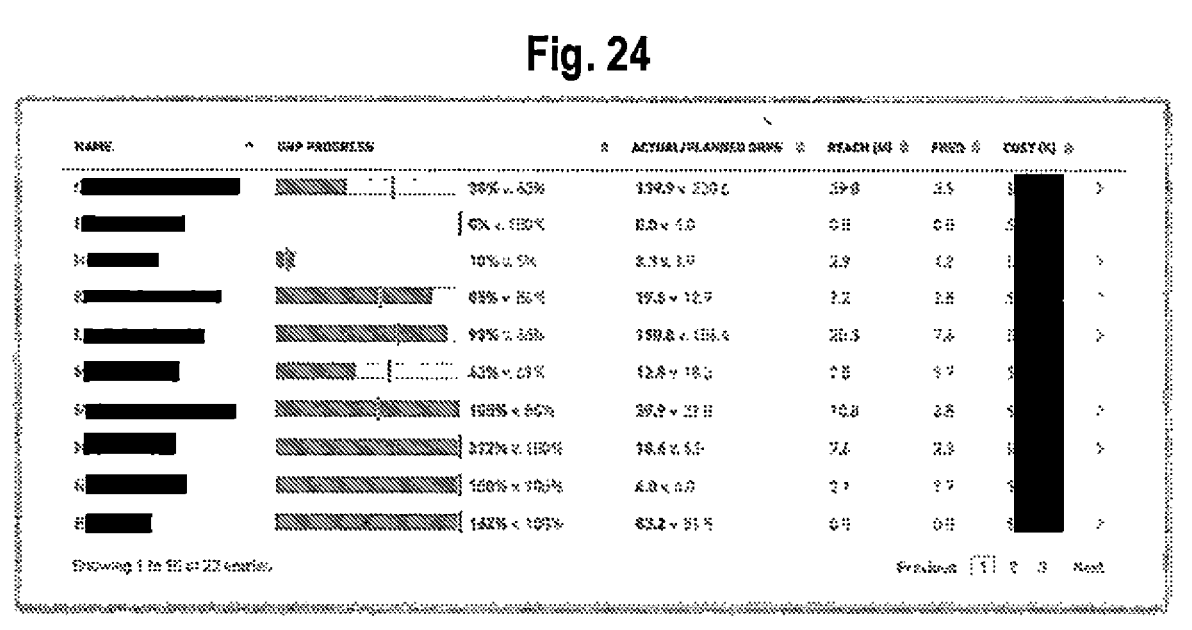

In an embodiment, a Reporting Suite comprises a series of reporting dashboards, implemented using programmed graphical user interfaces, that provide information on current campaign progress. These metrics can be used to track performance throughout a campaign and inform on-air-planning strategy to help a network or group of networks better utilize its promo inventory asset. In an embodiment, the first page of the Reporting Suite is the Overview page, which is programmed to display data for current campaigns through the latest reporting date. In an embodiment, this page is split in two sections. FIG. 24 illustrates a first section of an overview page that displays campaign information for current campaigns. In an embodiment, in the overview page each named campaign includes a graphical progress bar, which is displayed in the second "GRP Progress" column in both sections, and visualizes how actual GRP deliverables compare to each campaign's total planned GRPs. In an embodiment, a graphical bar represents the airing of actual GRPs. These visualizations are supplemented by percentage comparisons to the right. The first percentage value represents how many actual GRPs have aired as a percentage of the total planned GRPs. The second percentage value represents how many planned GRPs have been completed thus far as a percentage of the total planned GRPs. The column to the right of the progress bar shows actual and planned GRP numbers to date. While the percentages in the "Progress Bar" column represented the progress of actual and planned GRPs as a percentage over total planned GRPs, this column shows raw values. The percentages in the "GRP Progress" and the actual GRP numbers in the "Actual/Planned GRPs" column are shown in green, orange, or red in one embodiment, but in other embodiments, other visually distinctions may be used. In one embodiment, Green numbers connote that the campaign is on track. This campaign is in good standing; Orange numbers connote that the campaign is somewhat on track. This campaign is in fair standing; Red numbers connote that the campaign is far from meeting its GRP allocation. This campaign is in poor standing. In an embodiment, the system is programmed to calculate these numbers by calculating the difference between actual GRPs and planned GRPs expressed as a percentage of total GRPs. In other words, the difference of the percentage values in the "GRP Progress" column is analyzed. If those numbers are within a range of 10 percentage points, the campaign is in good standing. If these numbers are within a range of 25 percentage points, the campaign is in fair standing. If these numbers have a percentage point differential above 25, the campaign is in poor standing.

In an embodiment, Reporting Suite provides information for 13 different demographics. One can select which demographic they would like information for via a dropdown on the top right of the dashboards. To find more information about a given campaign or network, user input may select on the hyperlink on each show's/network's row on the overview page.

Figure 25:
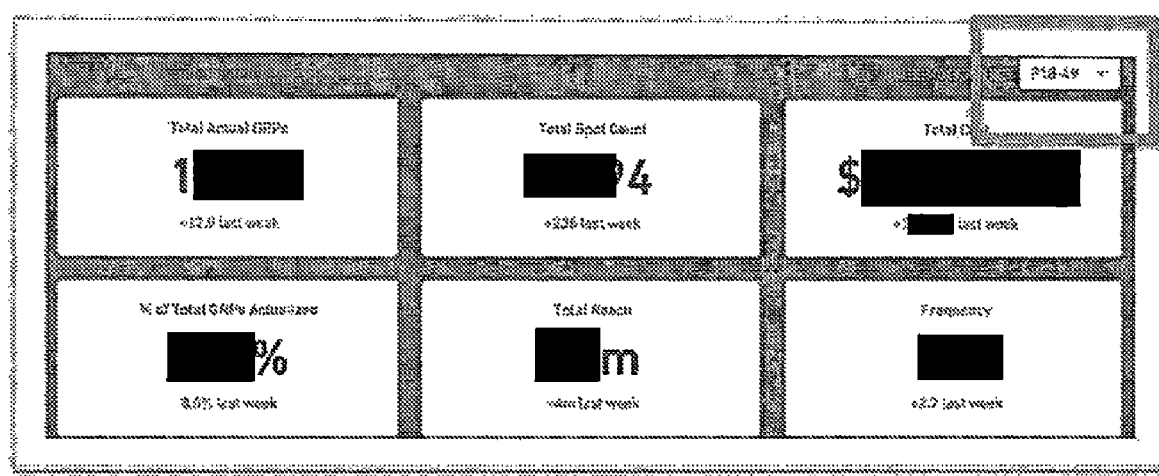
FIG. 25 illustrates an example first section of a campaign page.

The Campaign Page shows an overview of the performance of a show's campaign across all networks and comprises three sections. The first section presents a series of cards to provide a quick overview of the campaign. FIG. 25 illustrates an example first section of a campaign page. These cards display information for a show's entire campaign thus far through the last reporting date (which can be found right under the Show's title), as well as the last week of the campaign (shown in green and red numbers). User input via a dropdown in the top right portion of the display may select different demographics.

Figure 26:
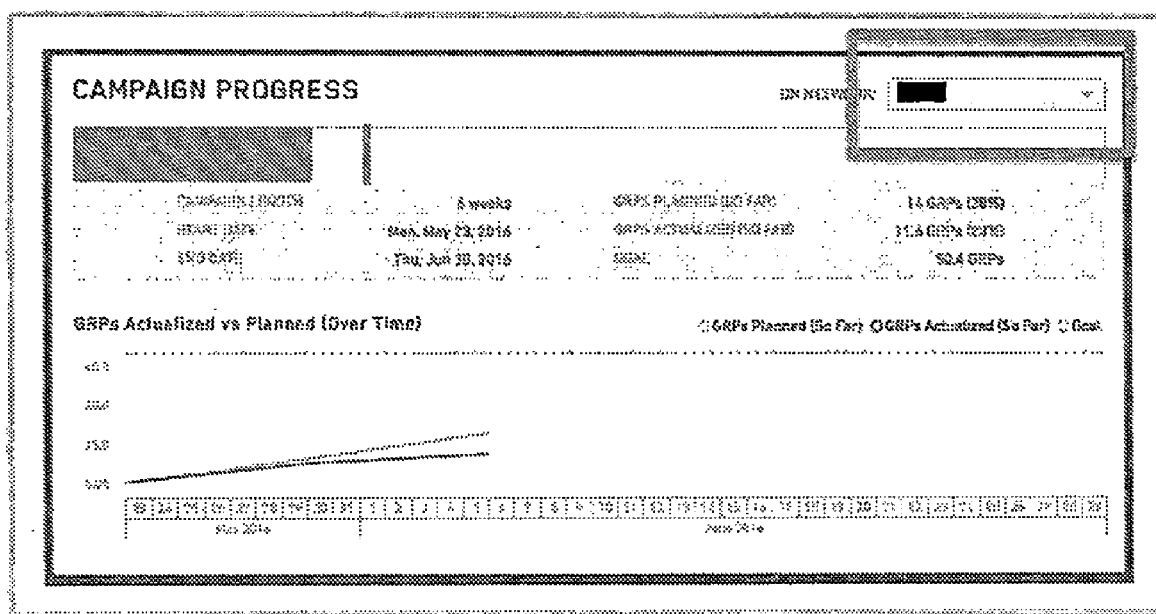
FIG. 26 illustrates a campaign progress view, which comprises a more in-depth presentation of the progress bar shown on a prior page.

FIG. 26 illustrates a campaign progress view, which comprises a more in-depth presentation of the progress bar shown on the Overview page. On the campaign page, overall campaign progress is displayed and a campaign's progress for a specific network can be displayed. To view progress for different networks, user input can select the dropdown on the top right of the "Campaign Progress" Section and select a network or "All Networks" to view an aggregate summary.

Figure 27:
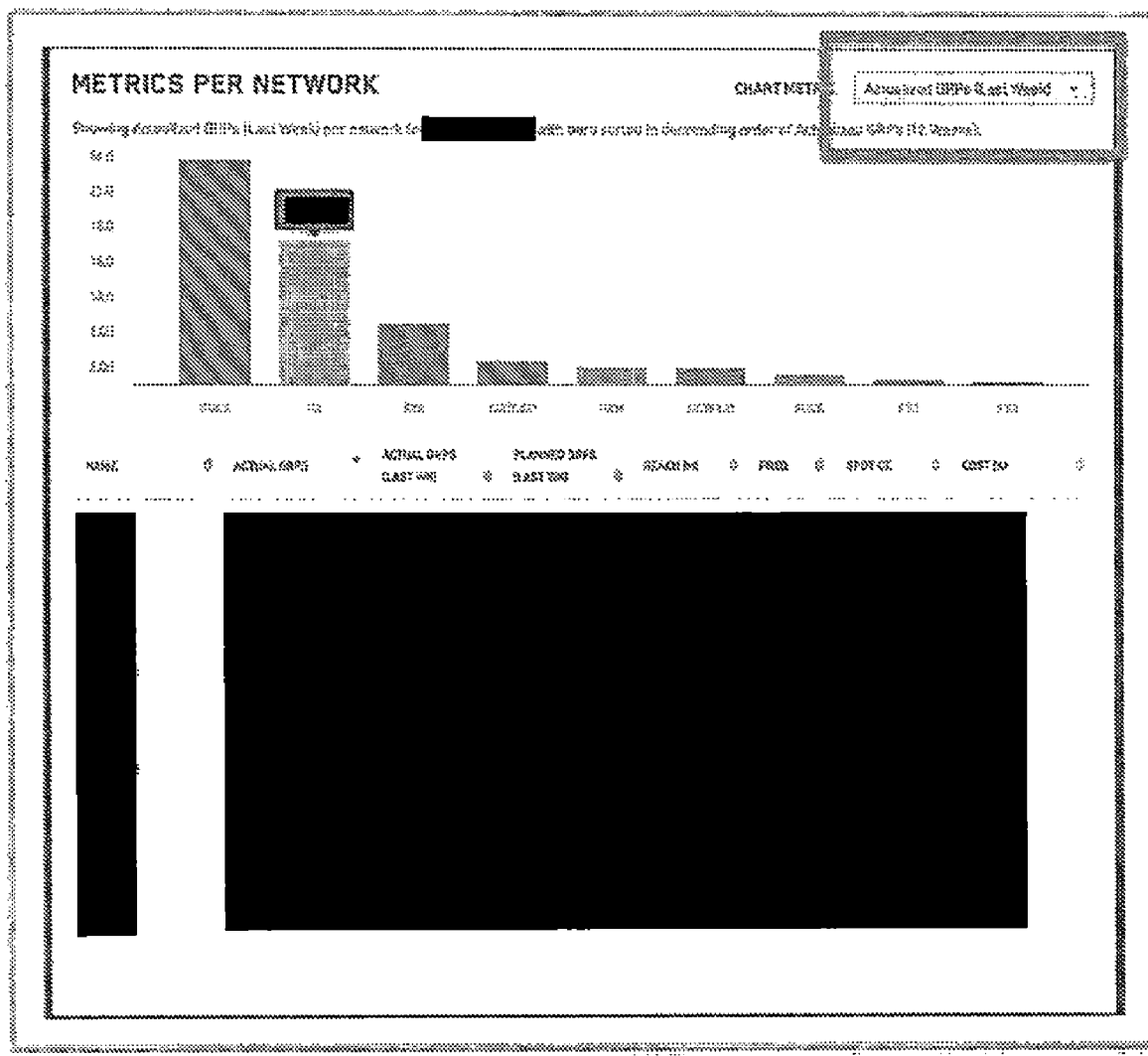
FIG. 27 illustrates a section of the campaign page that displays a table with metrics for all networks for a particular show.

FIG. 27 illustrates a section of the campaign page that displays a table with metrics for all networks for a particular show. The table also includes a chart above to visualize some of these different metrics. To view a bar graph representation of different metrics, user input may select the drop-down menu on the top right of the graph. To view more information for a given network, user input can select on the hyperlink to be taken to that channel's Network Page.

A Network Page presents metrics for all current campaigns airing on a given network. This page is similar to the Campaign page and has sections comprising a metric cards overview page that displays information for all current campaigns for their entire campaign and the last week. Demographic selections can be made. A metrics per show section can display data for all current networks that have aired promotions. This section is made up of a table and an associated bar graph above it to visualize some of the data provided. In an embodiment, to view a bar graph representation of different metrics, user input may select the drop-down menu on the top right of the graph. To view more information for a given show, user input may select the hyperlink to be taken to that show's Campaign Page.

The Reporting Suite as just described provides programmed displays of several kinds of data and calculated metrics. In an embodiment, reporting provides data on campaigns that have been entered using the Network Planning page and where the last reporting date falls before the end date of a campaign; these criteria define a "current campaign." In an embodiment, Reporting Dashboard Suite pulls data through 5-7 days before the current date. That is, the latest reporting date shown on the top of every page is a few days behind today's actual date. This lag is due to the time needed to populate AMRLD viewing data. Reach and frequency are calculated using the AMRLD viewing sample, and thus these metrics must adhere to the latest date reported for that viewership data. The Reporting Suite also reports GRP values that aim to provide a fair measurement of GRP deliverables across all networks in a network group. In an embodiment, all local breaks and interstitials are removed in GRP calculations. GRP numbers include impressions solely from pure promotional content.

In an embodiment, calculations of cost of promotional campaigns rest on finding the opportunity cost of airing advertisements during those slots. In an embodiment, cost calculation comprises four (4) main programmed steps. First, the system finds the average dollar amount paid by advertisers for a 30 second slot for a given program instance. If this information is not available, the system find the average dollar amount paid for a slot during a given hour, day-part, or day, based on using the most granular data available. Second, the system excludes any ADU slots from the above calculation. This gives a fair estimate for the average price advertisers are willing to pay for a slot during this time. Third, the system equalizes the dollar amount of a 30-second slot to the length of the given slot. That is, if the average 30-second slot cost an advertiser $x, and a slot is 15 seconds long, the cost of that slot is $x/2. And, the system is programmed to multiply the slot's cost with a fraction of actual impressions achieved during the slot/guaranteed impressions that were paid for. This allows the system to factor in the true impression performance with regards to what the advertiser asked for. Thus, if a slot's cost was $100, but achieved half of the guaranteed impressions it was promised for, the system discounts the slot's cost by 0.5.

4. Example Implementing Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
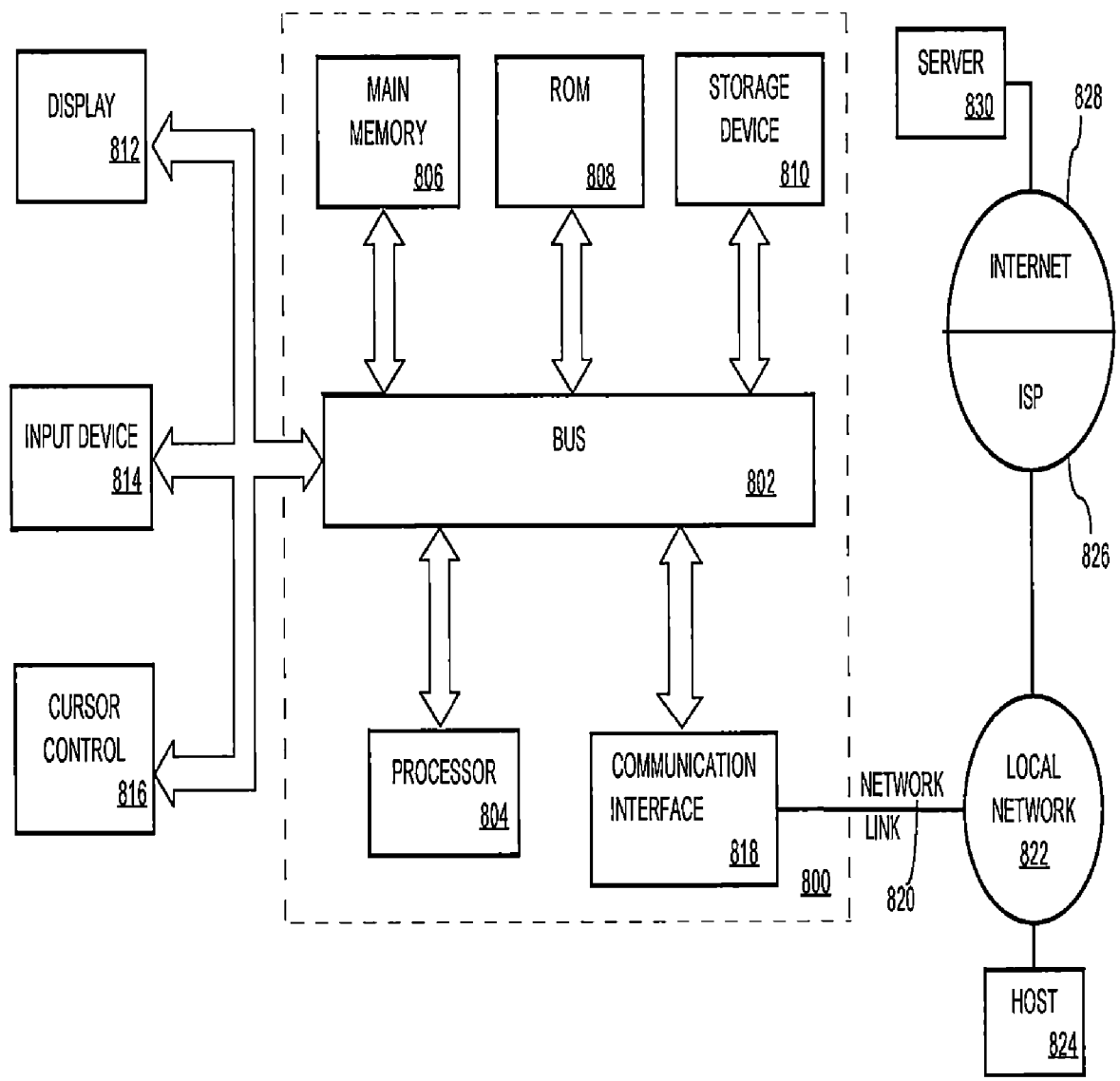
FIG. 8 depicts a computer system upon which an embodiment may be implemented.

For example, FIG. 8 is a block diagram that depicts a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

5. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing method comprising:
    generating impression estimate data that specifies an estimated total number of impressions of a plurality of non-program media items that are possible during future transmission of a plurality of media programs via a plurality of media channels;
    based at least in part on the impression estimate data, generating campaign data specifying a target number of impressions of a particular non-program media item and specifying one or more particular media channels to receive the particular non-program media item;
    calculating, for each available timeslot of a plurality of available timeslots across the one or more particular media channels, a conversion probability that the particular non-program media item, if presented during said each available timeslot, would convert one or more current non-consumers of a particular media program to one or more consumers of the particular media program;
    based at least in part on the campaign data, the conversion probability for each available timeslot, and based upon transmission schedule data that specifies future times of transmission of the plurality of media programs via the plurality of media channels, automatically determining digitally stored schedule data that specifies a set of times to transmit the particular non-program media item to achieve the target number of impressions;
    digitally transmitting the digitally stored schedule data to one or more of the media channels for use in controlling on-air transmission of the non-program media items that are specified in the schedule in association with the media programs that are specified in the schedule;
    wherein the method is performed by one or more computing devices.

2. The method of claim 1, further comprising generating the impression estimate data based at least in part upon receiving ratings data that specifies actual past impressions for particular episodes of particular media programs; calculating the impression estimate data using a linear regression using the ratings data for a specified minimum number of the episodes.

3. The method of claim 1, further comprising:
receiving ratings data that specifies actual past impressions for particular episodes of particular media programs;
calculating a proxy value representing an expected conversion rate of the non-program media items that can be shown during a particular media program that is in the ratings data;
receiving a duplication value that specifies a number of client devices that view a first media program and later also watch a second media program;
generating the campaign data specifying a target number of impressions of a particular non-program media item and specifying one or more particular media channels to receive the particular non-program media item, based on the impression estimate data, the proxy value, and the duplication value, and using one or more constraint operations.

4. The method of claim 1, further comprising:
receiving the campaign data and the transmission schedule data that specifies timeslots for future times of transmission of the plurality of media programs via the plurality of media channels;
receiving promotion data describing a plurality of non-program media items that are available for insertion in each media program that is represented in the transmission schedule data;
calculating all permutations of the timeslots, the non-program media items, and the campaign data;
automatically calculating the digitally stored schedule data using a quadratic optimization algorithm that specifies a plurality of times to transmit the non-program media items and the particular non-program media item to achieve the target number of impressions.

5. The method of claim 1, further comprising:
automatically selecting, from the plurality of available timeslots, a first plurality of unconfirmed placements for presenting the particular non-program media item based, at least in part, on the conversion probabilities calculated for the first plurality of unconfirmed placements;
selecting, from the first plurality of unconfirmed placements, one or more confirmed placements for presenting the particular non-program media item based, at least in part, on input by a user that selects the one or more confirmed placements; and
scheduling the particular non-program media item for presentation during the one or more confirmed placements.

6. The method of claim 5, further comprising monitoring consumption of the particular non-program media item in the one or more confirmed placements.

7. The method of claim 5, further comprising determining a second plurality of unconfirmed placements based on the one or more confirmed placements.

8. The method of claim 5, further comprising determining the conversion probabilities based on at least one of a group comprising media consumption data associated with the one or more current non-consumers, demographic data associated with the one or more current non-consumers, and genre data associated with the media program.

9. The method of claim 5, wherein the first plurality of unconfirmed placements is optimized based on one or more user-specified constraints comprising a target frequency for presenting the particular non-program media item or a target consumption level for the particular non-program media item.

10. The method of claim 5, further comprising displaying the first plurality of unconfirmed placements in a graphical user interface along with one or more comparison metrics comprising a demographic correlation, a conversion prediction, a promotion frequency, or a temporal proximity to the particular media program.

11. The method of claim 5, wherein the first plurality of unconfirmed placements is associated with the particular non-program media item and one or more alternative promotions.

12. The method of claim 5, wherein the first plurality of unconfirmed placements comprises a plurality of ranked timeslots.

13. The method of claim 5, further comprising determining the first plurality of unconfirmed placements for the particular non-program media item, concurrently with determining a plurality of unconfirmed placements for a different non-program media item based on balancing user-specified constraints for the particular non-program media item and the different non-program media item.

14. A computer system comprising:
one or more processors;
one or more non-transitory computer-readable data storage media coupled to the one or more processors and storing projection instructions which are programmed, when executed using the one or more processors, to cause generating impression estimate data that specifies an estimated total number of impressions of a plurality of non-program media items that are possible during future transmission of a plurality of media programs via a plurality of media channels;
planning instructions stored on the data storage media which are programmed, when executed using the one or more processors, to cause based at least in part on the impression estimate data, generating campaign data specifying a target number of impressions of a particular non-program media item and specifying one or more particular media channels to receive the particular non-program media item;
scheduling instructions stored on the data storage media which are programmed, when executed using the one or more processors, to cause:
calculating, for each available timeslot of a plurality of available timeslots across the one or more particular media channels, a conversion probability that the particular non-program media item, if presented during said each available timeslot, would convert one or more current non-consumers of a particular media program to one or more consumers of the particular media program, and
based at least in part on the campaign data, the conversion probability for each available timeslot, and based upon transmission schedule data that specifies future times of transmission of the plurality of media programs via the plurality of media channels, automatically determining digitally stored schedule data that specifies a set of times to transmit the particular non-program media item to achieve the target number of impressions;
digitally transmitting the digitally stored schedule data to one or more of the media channels for use in controlling on-air transmission of the non-program media items that are specified in the schedule in association with the media programs that are specified in the schedule.

15. The computer system of claim 14, wherein the projection instructions are programmed to cause generating the impression estimate data based at least in part upon receiving ratings data that specifies actual past impressions for particular episodes of particular media programs; calculating the impression estimate data using a linear regression using the ratings data for a specified minimum number of the episodes.

16. The computer system of claim 14, wherein the planning instructions and projection instructions are programmed to execute: receiving ratings data that specifies actual past impressions for particular episodes of particular media programs; calculating a proxy value representing an expected conversion rate of the non-program media items that can be shown during a particular media program that is in the ratings data; receiving a duplication value that specifies a number of client devices that view a first media program and later also watch a second media program; generating the campaign data specifying a target number of impressions of a particular non-program media item and specifying one or more particular media channels to receive the particular non-program media item, based on the impression estimate data, the proxy value, and the duplication value, and using one or more constraint operations.

17. The computer system of claim 14, wherein the planning instructions, projection instructions and scheduling instructions are programmed to execute: receiving the campaign data and the transmission schedule data that specifies timeslots for future times of transmission of the plurality of media programs via the plurality of media channels; receiving promotion data describing a plurality of non-program media items that are available for insertion in each media program that is represented in the transmission schedule data; calculating all permutations of the timeslots, the non-program media items, and the campaign data; automatically calculating the digitally stored schedule data using a quadratic optimization algorithm that specifies a plurality of times to transmit the non-program media items and the particular non-program media item to achieve the target number of impressions.

18. The computer system of claim 14, wherein the scheduling instructions are programmed to execute automatically selecting, from the plurality of available timeslots, a first plurality of unconfirmed placements for presenting the particular non-program media item based, at least in part, on the conversion probabilities calculated for the first plurality of unconfirmed placements; selecting, from the first plurality of unconfirmed placements, one or more confirmed placements for presenting the particular non-program media item based, at least in part, on input by a user that selects the one or more confirmed placements; and scheduling the particular non-program media item for presentation during the one or more confirmed placements.

* * * * *